United States Patent
Galitsky

(10) Patent No.: US 10,592,505 B2
(45) Date of Patent: Mar. 17, 2020

(54) NATURAL LANGUAGE INTERFACES FOR DATABASES USING AUTONOMOUS AGENTS AND THESAURI

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/522,549

(22) Filed: Jul. 25, 2019

(65) Prior Publication Data
US 2020/0034362 A1     Jan. 30, 2020

Related U.S. Application Data

(60) Provisional application No. 62/703,389, filed on Jul. 25, 2018.

(51) Int. Cl.
*G06F 16/2452*     (2019.01)
*G06F 17/27*     (2006.01)

(52) U.S. Cl.
CPC .... *G06F 16/24522* (2019.01); *G06F 17/2795* (2013.01)

(58) Field of Classification Search
CPC .. G06F 16/313; G06F 16/316; G06F 16/3329; G06F 16/334; G06F 16/3347; G06F 16/338; G06F 16/93; G06F 2216/11; G06F 16/24534; G06F 16/248; G06F 16/9535; G06F 17/271; G06F 17/2785
See application file for complete search history.

(56) References Cited

U.S. PATENT DOCUMENTS

| | | | |
|---|---|---|---|
| 10,489,393 B1* | 11/2019 | Mittal | G06F 16/243 |
| 2017/0039281 A1* | 2/2017 | Venkata | G06F 16/248 |
| 2017/0083569 A1* | 3/2017 | Boguraev | G06F 17/2705 |
| 2018/0165330 A1* | 6/2018 | Halbani | G06F 16/24522 |
| 2018/0349377 A1* | 12/2018 | Verma | G06F 17/278 |
| 2019/0163681 A1* | 5/2019 | Benedict | G06F 16/24522 |

(Continued)

OTHER PUBLICATIONS

"Apache OpenNLP Developer Documentation", Available online at: http://opennlp.apache.org/, 2011, 61 pages.

(Continued)

*Primary Examiner* — Matthew H Baker
(74) *Attorney, Agent, or Firm* — Kilpatrick Townsend & Stockton LLP

(57) ABSTRACT

An aspect of the present disclosure relate to translating natural language queries into native database queries. For example, a database application receives a natural language query from a user, divides the query into clauses, determines keywords from the clauses, and maps keywords in the query to native query that can query a database. In the case that the natural language query includes keywords that are not mapped, the application resolves an ambiguity by communicating with a user device. In the case that a keyword cannot be mapped, the application can map the keyword to a custom index that includes synonyms derived using pairwise generalization or other techniques. Once all keywords are mapped, the database application generates a native database query and obtains results from a database.

20 Claims, 16 Drawing Sheets

(56) References Cited

U.S. PATENT DOCUMENTS

2019/0278771 A1* 9/2019 Bozkaya ............. G06F 16/3329

OTHER PUBLICATIONS

Agrawal et al., "DBIQS—An Intelligent System for Querying And Mining Databases Using", International Conference On Information Systems And Computer Networks (ISCON), IEEE, Mar. 2014, pp. 39-44.

Alani et al., "Ontology Ranking Based on the Analysis of Concept Structures", Proceedings of the 3rd International Conference on Knowledge Capture, Oct. 2-5, 2005, pp. 51-58.

Buitelaar et al., "A Protege Plug-in for Ontology Extraction from Text Based on Linguistic Analysis", Proceedings of the International Semantic Web Conference (ISWC), 2003, 14 pages.

Cardie et al., "Guest Editor's Introduction: Machine Learning and Natural Language", Machine Learning, vol. 1, No. 5, Feb. 1999, 5 pages.

Carreras et al., "Introduction to the CoNLL-2004 Shared Task: Semantic Role Labeling", Proceedings of the Eighth Conference on Computational Natural Language Learning, Association for Computational Linguistics, May 6-7, 2004, pp. 89-97.

Chu et al., "An Ontology-Supported Database Refurbishing Technique and Its Application in Mining Actionable Troubleshooting Rules from Real-life Databases", Engineering Applications of Artificial Intelligence, vol. 21, No. 8, Dec. 2008, pp. 1430-1442.

Cimiano et al., "Learning Taxonomic Relations from Heterogeneous Sources of Evidence", Ontology Learning from Text: Methods, Evaluation and Applications, IOS Press, 2003, pp. 1-15.

Dzikovska et al., "Generic Parsing for Multi-Domain Semantic Interpretation", Proceedings of the Ninth International Workshop on Parsing Technology, Association for Computational Linguistics, Oct. 2005, pp. 196-197.

Galitsky et al., "Assessing Plausibility of Explanation and Meta-Explanation in Inter-Human Conflicts", A Special Issue on Semantic-based Information and Engineering Systems, Engineering Applications of Artificial Intelligence, vol. 24, No. 8, Dec. 2011, pp. 1472-1486.

Galitsky, "Disambiguation Via Default Rules Under Answering Complex Questions", International Journal of Artificial Intelligence Tools, vol. 14, No. 1-2, World Scientific, 2004, 18 pages.

Galitsky et al., "From Generalization of Syntactic Parse Trees to Conceptual Graphs", Proceedings of the 18th International Conference on Conceptual Structures: From Information to Intelligence, Jul. 26-30, 2010, pp. 185-190.

Galitsky et al., "Generalization of Parse Trees for Iterative Taxonomy Learning", Information Sciences, vol. 329, Feb. 2016, pp. 125-143.

Galitsky et al., "Inferring the Semantic Properties of Sentences by Mining Syntactic Parse Trees", Data & Knowledge Engineering, vol. 81-82, Available online at: http://dx.doi.org/10.1016/j.datak.2012.07.003.2012, Nov.-Dec. 2012, 44 pages.

Galitsky, "Machine Learning of Syntactic Parse Trees for Search and Classification of Text", Engineering Application of AI, vol. 26, No. 3, Available online at: http://dx.doi.org/10.1016/j.engappai.2012.09.017, Mar. 2013, pp. 1072-1091.

Galitsky et al., "Using Generalization of Syntactic Parse Trees for Taxonomy Capture on the Web", Proceedings of the 19th International Conference on Conceptual Structures for Discovering Knowledge, Jul. 25-29, 2011, pp. 104-117.

Grefenstette, "Explorations in Automatic Thesaurus Discovery", Rank Xerox Research Centre, Kluwer Academic Publishers, Jan. 1994, 315 pages.

Gupta et al., "IQS-Intelligent Querying System Using Natural Language Processing", International conference of Electronics, Communication and Aerospace Technology (ICECA), IEEE. vol. 2, Apr. 20, 2017, pp. 410-413.

Hearst, "Automatic Acquisition of Hyponyms from Large Text Corpora", Proceedings of the 14th International Conference on Computational Linguistics, Aug. 23-28, 1992, pp. 539-545.

Kapoor et al., "Algorithms for Enumerating All Spanning Trees of Undirected and Weighted Graph", SIAM Journal on Computing, vol. 24, No. 2, Society for Industrial and Applied Mathematics, Apr. 1995, pp. 247-265.

Kerschberg et al., "A Personalizable Agent for Semantic Taxonomy-Based Web Search", Lecture Notes in Computer Science, Jan. 2002, 29 pages.

Kingsbury et al., "From TreeBank to PropBank", Proceedings of the Third International Conference on Language Resources and Evaluation, European Language Resources Association, Available online at: http://www.lrec-conf.org/proceedings/lrec2002/pdf/283.pdf, May 2002, 5 pages.

Kozareva et al., "Learning and Evaluating the Content and Structure of a Term Taxonomy", Spring Symposium on Learning by Reading and Learning to Read, 2009, 8 pages.

Li et al., "Understanding Natural Language Queries over Relational Databases", Sigmod Record, ACM, vol. 45, No. 1, Mar. 2016, pp. 6-13.

Lin, "Automatic Retrieval and Clustering of Similar Words", Proceedings of the 36th Annual Meeting of the Association for Computational Linguistics and 17th International Conference on Computational Linguistics, vol. 2, Aug. 10-14, 1998, pp. 768-774.

Lin et al., "DIRT—Discovery of Inference Rules from Text", Proceedings of the Seventh ACM SIGKDD International Conference on Knowledge Discovery and Data Mining, Aug. 26-29, 2001, pp. 323-328.

Liu et al., "Measuring Semantic Similarity between Named Entities by Searching the Web Directory", IEEE/WIC/ACM International Conference on Web Intelligence, Nov. 2-5, 2007, pp. 461-465.

Liu et al., "What Do They Think?: Aggregating Local Views About News Events and Topics", Proceedings of the 17th International Conference on World Wide Web, Apr. 21-25, 2008, pp. 1021-1022.

Makhalova et al., "News Clustering Approach Based on Discourse Text Structure", Proceedings of the First Workshop on Computing News Storylines, Jul. 2015, pp. 16-20.

Mansilla et al., "Automation of Social Networks with QA Agents", Proceedings of 9th International Conference on Autonomous Agents and Multi-Agent Systems, AAMAS, Jan. 2010, pp. 1437-1438.

Moschitti, "Efficient Convolution Kernels for Dependency and Constituent Syntactic Trees", Proceedings of the 17th European Conference on Machine Learning, Sep. 18-22, 2006, pp. 318-329.

Moschitti et al., "Semantic Role Labeling via Tree Kernel Joint Inference", Proceedings of the 10th Conference on Computational Natural Language Learning, Jun. 8-9, 2006, pp. 61-68.

Moschitti, "Syntactic and Semantic Kernels for Short Text Pair Categorization", Proceedings of the 12th Conference of the European Chapter of the ACL, Association for Computational Linguistics, Mar. 30-Apr. 3, 2009, pp. 576-584.

Navigli, "Word Sense Disambiguation: A Survey", ACM Computing Surveys, vol. 41, No. 2, Feb. 2009, pp. 10:1-10:69.

Pan et al., "A Survey on Transfer Learning", IEEE Transactions of Knowledge and Data Engineering, vol. 22, No. 10, Oct. 2010, pp. 1345-1359.

PCT/US2019/043505, "International Search Report and Written Opinion", Oct. 15, 2019, 12 pages.

Plotkin, "A Note on Inductive Generalization", Machine Intelligence 5, Chapter 8, 1970, pp. 153-163.

Poesio et al., "Acquiring Lexical Knowledge for Anaphora Resolution", Proceedings of the 3rd Conference on Language Resources and Evaluation (LREC), May 2002, pp. 1220-1224.

Raina et al., "Self-Taught Learning: Transfer Learning from Unlabeled Data", Proceeding ICML '07 Proceedings of the 24th international conference on Machine learning, Jun. 20-24, 2007, pp. 759-766.

Ravichandran et al., "Learning surface text patterns for a Question Answering system", Proceedings of the 40th Annual Meeting of the Association for Computational Linguistics, Jun. 2002, 7 pages.

Reinberger et al., "Generating and Evaluating Triples for Modelling a Virtual Environment", Proceedings of the 2005 OTM Confeder-

(56) References Cited

OTHER PUBLICATIONS ated international conference on the Move to Meaningful Internet Systems, Oct. 31-Nov. 4, 2005, pp. 1205-1214.
Resnik et al., "Evaluation of NLP Systems", The Handbook of Computational Linguistics and Natural Language Processing, Jun. 29, 2010, pp. 271-295.
Roth, "Compact, Evolving Community Taxonomies Using Concept Lattices", ICCS, Jul. 17-21, 2006, 14 pages.
Sanchez, "A Methodology to Learn Ontological Attributes from the Web", Data & Knowledge Engineering, vol. 69, No. 6, Jun. 2010, pp. 573-597.
Sanchez et al., "Pattern-based Automatic Taxonomic Learning from the Web", AI Communications, vol. 21, No. 1, Jan. 2008, pp. 27-48.
Schoenmackers et al., "Scaling Textual Inference to the Web", Proceedings of the Conference on Empirical Methods in Natural Language Processing, Oct. 2008, pp. 79-88.
Vicient et al., "An Automatic Approach for Ontology-Based Feature Extraction from Heterogeneous Textual Resources", Engineering Applications of Artificial Intelligence, vol. 26, No. 3, Mar. 2013, pp. 1092-1106.
Wang et al., "A Syntactic Tree Matching Approach to Finding Similar Questions in Community-based QA Services", Proceedings of the 32nd International ACM SIGIR Conference on Research and Development in Information Retrieval, Jul. 19-23, 2009, pp. 187-194.
Wu et al., "Automatic Pattern—Taxonomy Extraction for Web Mining", Proceedings of the 2004 IEEE/WIC/ACM International Conference on Web Intelligence, Sep. 20-24, 2004, pp. 242-248.
Zeng et al., "User-centric Query Refinement and Processing Using Granularity-based Strategies", Knowledge and Information Systems vol. 27, No. 3, May 26, 2010, pp. 419-450.

\* cited by examiner

1000

How to Decrease Your Federal Income Tax | eHow.com
the Amount of Federal Taxes Being Withheld; How to Calculate a Mortgage Rate After Income Taxes; How to Deduct *Sales Tax* From the Federal Income Tax

Itemizers Can Deduct Certain Taxes
... may be able to deduct certain taxes on your federal income tax return? You can take these deductions if you file Form 1040 and itemize deductions on Schedule A. Deductions decrease ...

Self Employment Irs Income Tax Rate Information & Help 2008, 2009 ...
You can now deduct up to 50% of what has been paid in self employment tax. · You are able to decrease your self employment income by 7.65% before figuring your tax rate.

How to Claim Sales Tax | eHow.com
This amount, along with your other itemized deductions, will decrease your taxable ... How to Deduct Sales Tax From Federal Taxes; How to Write Off *Sales Tax*; Filling Taxes with ...

Prepaid expenses and Taxes
How would prepaid expenses be accounted for in determining taxes and accounting for ... as the cash effect is not yet determined in the net income, and we should deduct a decrease, and ...

How to Deduct *Sales Tax* for New Car Purchases: Buy a New Car in ...
How to Deduct Sales Tax for New Car Purchases Buy a New Car in 2009? Eligibility Requirements ... time homebuyer credit and home improvement credits) that are available to decrease the ...

1. TurboTax® - Tax Deduction Wisdom - Should You Itemize?
   turbotax.Intuit.com > Tax Calculators & Tips - Cached
   Learn whether itemizing your deductions makes sense, or if you should simply take no-questions-asked standard deduction. The standard deduction is ...

2. 10 big deductions too many of us miss - tax preparation - MSN Money
   money.msn.com/taxes/10-big-deductions-too-many-of-us-miss-schn... - Cached
   A lot of taxpayers don't know they can save thousands of dollars with these tax break Did you forget about any of these deductions and credits?

3. The Most-Overlooked Tax Deductions
   www.klplinger.com/ .. /the-mostoverlooked-tax-deductions html - Cached
   Every year. the IRS dutifully reports the most common blunders that taxpayers make their returns. And every year, at or near the top of the "oops" list ...

4. Tax credits and Deductions
   taxes about com/od/deductionscredits/Doductions_Credits.htm - Cached
   Lower your tax bill by taking advantage of deductions and tax cradlts. Tips for preparing vourtaxes.

5. Tax Topics - Topic 503 Deductible Taxes
   www.irs gov/taxtoplcs/tc503 html - Cached
   Feb 7, 2011 - To be deductible, the tax must be imposed on you and must have been paid during your tax year. However, tables are available to determine...

6. Tax - Tax Deductions - H&R Block
   www.hrblock.com/taxes/tax.../deductions.../overlooked_deductions... - Cached
   Find Information on tax deductions from H&R Block.

7. What is a Tax Deduction?
   www.wisegeek.com/whot-ls-a-tax-deductlon.htm - Cached
   May 13, 2011 - A tax deduction reduces the taxes a person must pay by a certain percentage. Tax deductions are different from tax credits, which...

1. Tax deductions you might overlook - USATODAY.com
   www.usatoday.com/money/.../taxes/2011-03-18-tax-deductions.htm - Cached
   Mar 18, 2011 - Tax deductions you might overlook. Including some for people who don't Itemize.
2. 10 Tax Deductions You Don't Want to Overlook | brip blap
   www.bripblap.com/10-tax-deductions-you-dont-want-to-overlook/ - Cached
   As year end approaches it's time to review your taxes and make sure you aren't goln to miss out on deductions.
3. Hidden Tax Deductions | Lower Your Tax B ill
   www.fool.com/personal.../taxes/6-deductlons-even-pros-overlook.as... - Cached
   Mar 3, 2006 - The Motley Fool - Here are some little-known ways to reduce your tab.
4. Don't overlook tax break of mortgage points - Bankrate.com
   www.bankrate.com > Tax Guide > Tax Deductions - Cached
   Tax Gulde » Tax Deductions » Don't overlook tax break of mortgage points. If you have ever taken out a mortgage, you probably already know of the tax…
5. Tax Deductions You Might Overlook | witx.com
   www.witx.com/news/article/.../Tax-Deductions-You-Might-Overloo... - Cached
   Mar 20, 2011 - With the tax deadline approaching. here's a look at some deductions you might overlook: Tax breaks for non-Itemizers…

1. Publication 530 (2010) Tax Information for Homeowners
   www.irs.gov/publications/p530/ar02.html - Cached
   You may not be able to deduct the total you pay into the escrow account. You can deduct only the real estate taxes that the lender actually paid from escrow...

2. Tax Topics – Topic 503 Deductible Taxes
   www.irs.gov/taxtoplcs/tc503.html - Cached
   Feb 7 . 2011 - Generally. you can take either a deduction or a tax credit...
   Show more results from irs.gov 3. Turbo Tax - Tax Breaks and Home Ownership
   turbotax.intuit.com > Tax Calculators & Tips - Cached
   You can deduct a late payment charge as home mortgage interest as long as The...Don'tdeduct your payments into your escrow account as real estate taxes...

4. Owning real estate. what's tax deductible?
   www.realestateabc.com/taxes/deductible2_htm - Cached
   Realtors are quick to point out that home ownership allows a lot of tax advantages not...A homeowner can deduct points used to obtain a mortgage when buying a home. mortgageinterest...Many mortgages have impound or escrow accounts...

5. Mortgage – Filing Status
   mobile.hrblock.com/index/tax-qa/questions?cat=Mortgage - Cached
   Jump to Can I deduct prepaid taxes from a mortgage refinance that I paid...
   You can onlydeduct prepaid...in an escrow account...

6. Mortgage Deduction Rules – The Nest – Budgeting Money
   Budgeting.thenest.com/mortgage-deduction-rules-3968.html - Cached
   Even though the lender makes the payment, the money came from you. You can deduct real estate and property taxes paid from your mortgage's escrow account...

7. Real Estate Taxes / property taxes are fully tax deductible
   www.real-estate-owner.com/ real-estate-tax.html – Cached
   limits on the dollar amount of real estate taxes you can deduct...Taxes Included in Mortgage Payment Your monthly mortgage payment to a bank or other mortgage...able to deduct the total you pay into the escrow account

*FIG. 13*

NATURAL LANGUAGE INTERFACES FOR DATABASES USING AUTONOMOUS AGENTS AND THESAURI

CROSS-REFERENCES TO RELATED APPLICATIONS

This application claims priority to U.S. Provisional Application No. 62/703,389, filed Jul. 25, 2018, the entirety of which is incorporated herein for all purposes.

TECHNICAL FIELD

This disclosure is generally concerned with databases. More specifically, this disclosure is concerned with translating natural language queries into native database queries.

BACKGROUND OF THE INVENTION

Relational databases can be accessed by modern querying languages such as Structured Query Language (SQL), which supports a broad range of querying mechanisms. But SQL interfaces can be difficult for non-software developers to design search queries in these languages. As such, these lower-quality queries cause lower-quality results.

Some solutions exist for translating natural language (NL) queries to database queries. But these solutions are deficient. For example, some solutions can use trained neural networks to perform the translation. But these solutions suffer from issues. For example, a large training dataset may be needed, and the solutions are domain-specific.

Hence, new solutions are needed that can translate natural language queries into modern querying languages.

SUMMARY

This disclosure relates to translating natural language queries into native database queries. For example, a database application receives a natural language query from a user, divides the query into clauses, determines keywords from the clauses, and maps keywords in the query to native query that can query a database. In the case that the natural language query includes keywords that are not mapped, the application resolves this ambiguity with a user device. In the case that a keyword cannot be mapped to the database in a traditional manner, e.g., via mapping to tables or fields, the application can map the keyword to a custom index that includes synonyms derived using pair-wise generalization or other techniques.

An aspect of the present disclosure relates to a method for servicing a natural language query via a database. The method accesses a database with tables. Each table includes a label identifying the table, and fields, each field including an attribute. The method further accesses a custom database index including entities, the entities including the fields, the attributes, and one or more synonyms of the fields or attributes. The method further accesses a natural language search query. The method further constructs a parse tree from the natural language search query. The parse tree includes at least one terminal node including a word type and at least one terminal node that represents a word or phrase of the natural language search query. The parse tree identifies syntactic information of the natural language query. The method further identifies, from the parse tree, one or more clauses. A clause includes keywords and wherein each keyword is a noun or a verb. The method further performs one or more of the following: matching each keyword to a label of one of the tables, to a field of one of the tables, and/or an attribute of a field, and determining a threshold level of a match between the keyword and the custom database index. The method further generates a database query from the mapped keywords. The method further obtains a result from the database by providing the database query to the database. The method further displays the result to a user device.

In a further aspect, the method determines that a keyword of the keywords is not matched in the database and inserts an implicit node into the parse tree, wherein the implicit node identifies the keyword. The method presents the keyword to the user device.

In a further aspect, the method receives a clarification from the user device, updates the parse tree based on the clarification, and matches updated clauses from the parse tree to the database.

In a further aspect, mapping each keyword includes matching one of the keywords to the label of one of the tables.

In a further aspect, mapping each keyword includes matching one of the keyword to a threshold number of words of a field of one of the tables.

In a further aspect, mapping each keyword includes determining one or more synonyms of a keyword and mapping the one or more synonyms to a field of one of the tables.

In a further aspect, determining a threshold level of a match includes: obtaining a plurality of candidates by searching the custom database index, determining, for each candidate, a level of match between the entity and respective result, and determining an entity with a highest level of match of all the entities.

In a further aspect, the level of match between the keyword and the entity of the custom database index is determined using a term frequency-inverse document frequency.

In a further aspect, accessing a custom database index includes accessing a thesaurus including a set of connected nodes. The connected nodes include a root node and terminal nodes. The terminal nodes are synonyms for the root node. The method further iteratively, for each of the terminal nodes, performs operations. The operations include forming a search query including a path from the root node to the respective terminal node. The operations further include obtaining a set of results by providing the search query to a search engine. The operations further include computing a pair-wise generalization of each pair of results of the set of results. The pair wise-generalization extracts one or more keywords common to each result of the respective pair. The operations further include extracting words or phrases from the pair wise generalizations. The operations further include extracting a subset of the sorted elements that occur above a threshold frequency within the pair-wise generalizations. The operations further include creating new nodes from the extracted subset of elements. The operations further include connecting the new nodes to the respective terminal node.

The above-described methods can be implemented in a computer device or computer system. Program instructions can also be stored on non-transitory computer-readable medium.

BRIEF DESCRIPTION OF THE DRAWINGS

FIG. 10 depicts an example search results, in accordance with an aspect of the present disclosure.

FIG. 11 depicts thesaurus learning, in accordance with an aspect of the present disclosure.

FIG. 12 depicts thesaurus learning, in accordance with an aspect of the present disclosure.

FIG. 13 depicts thesaurus learning, in accordance with an aspect of the present disclosure.

DETAILED DESCRIPTION OF THE INVENTION

Aspects of the present disclosure relate to improved database systems. In particular, disclosed systems translate natural language queries into database queries by employing both linguistic and keyword-based approaches. Certain aspects also identify ambiguous terms within natural language queries and resolve these ambiguities by using autonomous agents ("chatbots"). In some cases, thesauri can be created and used to match words that people use to describe various entities, actions, or attributes with database tables or fields. In this manner, disclosed solutions provide improved database queries, and therefore more meaningful results, relative to existing solutions.

Natural language database interface have many advantages over popular query interfaces such as structured keyword-based searches, form-based request interfaces, and visual query builders. For example, a natural language interface enables naive users to specify complex queries without requiring the users be trained by database experts. But mapping a natural language query to a database can be difficult. For example, user queries can sometimes be ambiguous.

Autonomous agents are natural extensions of a natural language interface and can be used to clarify ambiguous terms provided by a user. For example, a user may search for "titanic." A natural language system attempts to match the term "titanic" with an existing database, but the term is ambiguous because it can refer to the movie or the boat of the same name. Therefore, databases and autonomous agents can operate in conjunction with each other when the agent facilitates error rectification in language understanding that is required for good queries of databases.

Certain Definitions

As used herein, "database" refers to an organized or structured set of data. A database can be organized into columns and rows.

As used herein, "table" refers to a relation within a database. A table can also be referred to as a "file" or a "class."

As used herein, "query" refers to a type of command that causes data to be retrieved from the server. An example of a Structured Query Language (SQL) query is "SELECT column1, column2 FROM table1, table2 WHERE column2='value'".

As used herein, a "natural language query" refers to a database query that is in natural language, e.g., English. An example of a natural language query is "how many employees had a raise this year?"

As used herein, a "column" or a "field" of a database or a database table. For example, a column maybe can be "a name," an "address", or a "zip code."

As used herein, a "row" or a "record" is a list of values for a particular column. For example, a first record may have the value "30021" for zip code, whereas the second record may have the value "20021" for zip code.

Figure 1:
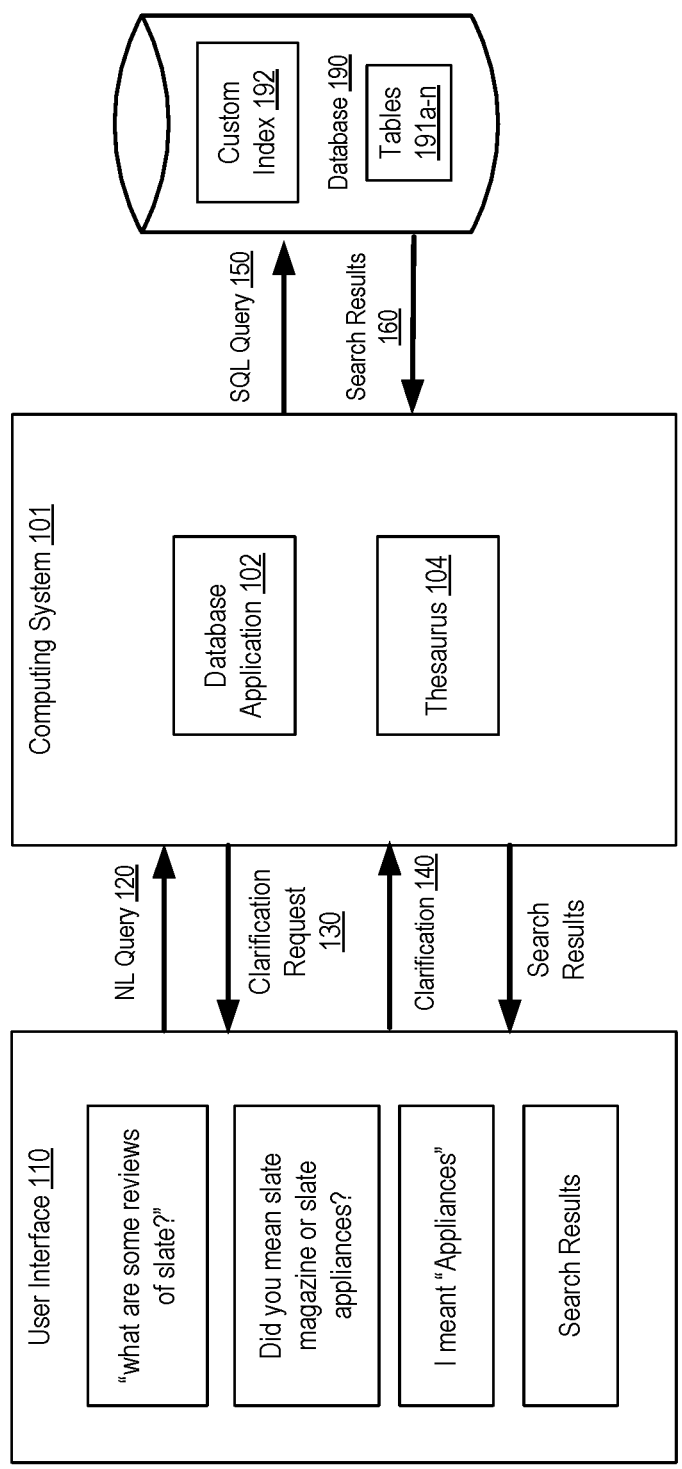
FIG. 1 is a diagram of a system for generating a database query from a natural language query, in accordance with an aspect of the present disclosure.

Turning now to the Figures, FIG. 1 is a diagram of a system for generating a database query from a natural language query, in accordance with an aspect of the present disclosure. FIG. 1 depicts computing environment 100, which includes a computing system 101 that can receive a natural language query via user interface 110, translate the query into a native database query, obtain results from the database 190, and provide the results back to the user interface 110. Various methods of mapping the natural language query to database queries can be used. Additionally or alternatively, computing system 101 can detect ambiguities in the natural language query and obtain clarification from via user interface 110, resulting in a more complete mapping and better search results.

Computing system 101 includes database application 102 and thesaurus 104. In an example, database application 102 performs functions relating to mapping natural language queries (e.g., NL query 120) to tables or fields of a database. Database application 102 can also perform functions relating to indexing databases and performing searches against a custom index, or creating the custom index itself.

Database 190 can contain organized information on any topic. Examples of topics include sports, music, literature, news, history, and science. Database 190 includes tables 191a-n, which can be organized any fashion. For example, if database 190 contains information about sports, then table 191a can include topics related to baseball, and table 191b to soccer, etc. Similarly, if database 190 includes information about musical instruments, then table 191a might include information about brass instruments, whereas table 191b includes information about percussion instruments, and so on. Each table 191a-n can include one or more fields. Continuing the previous examples, examples of fields are "teams" or "musical instrument type." Each table 191a-n can be linked with another table. For example, a table that includes information about soccer leagues might link to another table with specific teams within each league.

In some cases, database 190 can include custom index 192, which can be used to optimize SQL queries and data organization. For example, custom index 192 can be used to search a database differently than matching keywords to database parameters such as fields. Custom index 192 can be created by database application 102 or by another application. In other cases, database 190 and custom index 192 are provided by an external entity such as an organization with subject-matter expertise on the information in database 190. Database 190 can be externally located from computing system 101, for example, across a network.

User interface 110 can be any standard user interface such as a user interface on a desktop platform or mobile platform. User interface 110 can receive user input, e.g., NL query 120, and facilitate interactions with a user, e.g., by clarifying a request. User interface 110 can output data such as search results 160.

In an example, database application 102 receives NL (natural language) query 120 and attempts to match the clauses in the query to tables or fields in database 190 to native query 150. An example of a suitable process is explained further with respect to FIG. 2. In a simple example, NL query 120 includes clauses, e.g., "what are some reviews of slate?" Database application 102 creates a parse tree of the NL query 120 and identifies the clauses and keywords within the clauses. Continuing the above example, keywords are "reviews" and "slate."

In some cases, NL query 120 is ambiguous because database application 102 is unable to map keywords from NL query 120 to database tables, attributes, or entities within custom index 192. For example, "slate" may refer to "Slate" the magazine or "slate" the brand of appliances. In this case, database application 102 sends clarification request 130 to the user interface 110 and asks for clarification. The user clarifies that he or she is interested in "slate appliances," which is transmitted as clarification 140 to database application 102. In turn database application 102 proceeds with the search process, updating the parse tree with the new information, mapping the parse tree to a native query 150, and querying the database.

Analyzing a query can include creating parse trees from NL query 120. In another example, database application 102 analyzes the query 'Return users who watched more movies than Bob on Documentary after 2007' database application 102 creates a set of parse trees. The database application 102 provides the ambiguities to the user interface 110. For example, one candidate parse tree is explained as 'return the users whose movies on Documentary after 2007 is more than Bob's.' The database application 102 inserts implicit nodes into the tree, resulting in 'return the users, where the number of films in Documentary released after 2007 is more the number of films rented by Bob in Documentary released after 2007." Once the tree is finalized, the database application 102 determines one or more clauses from the trees as in the format attribute, [=/</>/like], value.

Thesaurus 104 is used by database application 102 to improve the matching performance of database application 102. Thesaurus 104 can include common or uncommon synonyms relating to entities in database 190. For example, a synonym of "football" may be "soccer." In an example of a movie rental context, database application 102 needs to know that customers, users, people, children, adults who rent, borrow, or take things like movies, films, or tapes from a rental company or employer that itself has employees, workers, helpers, providers who give, rent, deliver, or provide movies and films. For example, if a user device asks "who took the movie," the database application 102 needs to know that "took" might mean "rent," and that "movie" might mean "film," and so on. Information within thesaurus 104 can be mined from the internet or resources in real time. In another example, thesaurus 104 can provide information for an arbitrary domain by specifying relationships between above entities, their attributes and actions. Thesaurus 104 can be built or extended by using techniques described herein, for example, iteratively forming search queries and generalizing the results of the search queries, and using the generalized results as additional entries (or nodes) in the thesaurus. In this manner, the coverage of thesaurus 104 can be improved.

In some cases, the database application 102 can use a thesaurus to improve matching. Database application 102 can also match NL query 120 to native query 150, for example, in the case that one or more keywords are not mapped to fields of database 190, database application 102 can search thesaurus 104 with the ambiguous term and possibly identify a synonym of a database field name. In this case, database application 102 need not ask the user for a clarification.

Figure 2:
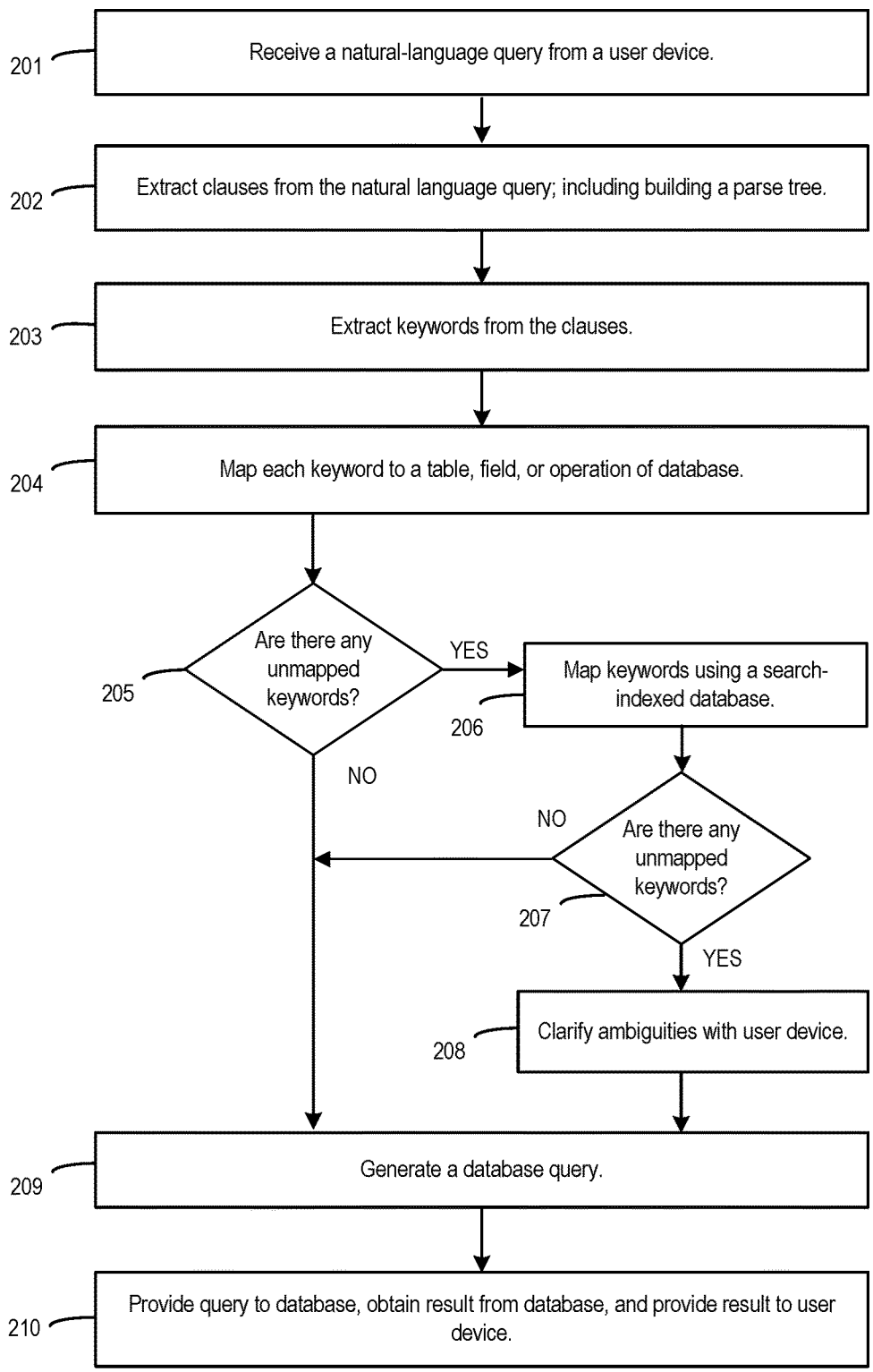
FIG. 2 is a flowchart depicting an example of a process for generating a database query from a natural language query, in accordance with an aspect of the present disclosure.

FIG. 2 is a flowchart depicting an example of a process 200 for generating a database query from a natural language query, in accordance with an aspect of the present disclosure. Process 200 can be implemented by database application 102 or another application.

At block 201, process 200 involves receiving a natural-language query from a user device. For example, database application 102 receives NL query 120. An example of a NL query is "what is staff first name when movie return date is after 2005 Jun. 2 01:02:05."

Figure 3:
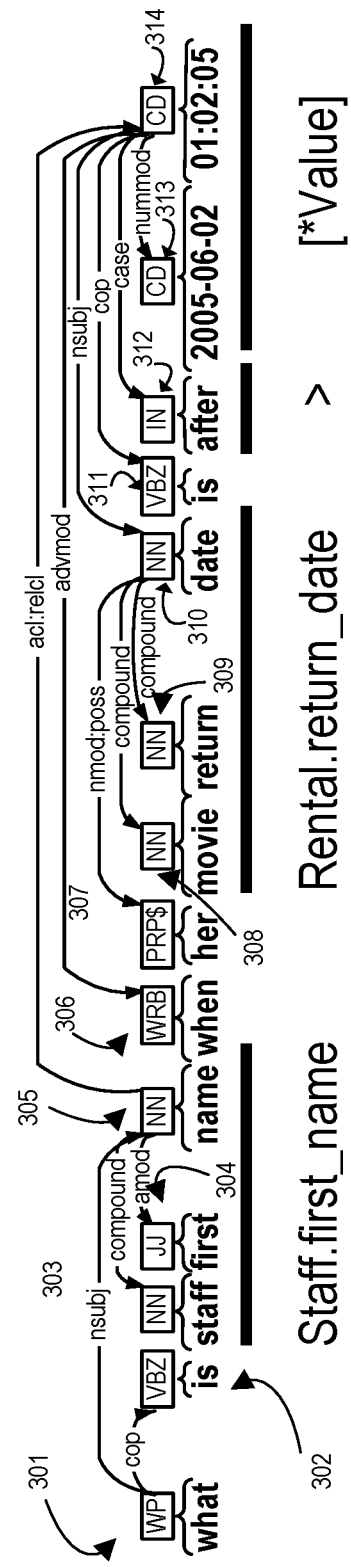
FIG. 3 is a diagram depicting a parse tree for a natural language query, in accordance with an aspect of the present disclosure.

At block 202, process 200 involves extracting clauses from query including building a parse tree. Database application 102 extracts clauses from NL query 120 by building a parse tree. FIG. 3 depicts the parse tree for the above example.

FIG. 3 is a diagram depicting a parse tree for a natural language query, in accordance with an aspect of the present disclosure. FIG. 3 depicts parse tree 300, which includes nodes 301-314. Each of nodes 301-314 corresponds to a word of the NL query 120. Parse tree 300 can obtained using any standard techniques.

Database application 102 accesses the parse tree and identifies any "wh" words. "Wh" words include what, where, when, and why. Database application 102 extracts the phrase which immediately follows the "wh" word. This phrase is the shortest one among the words that follow the "wh" word. For example, nouns, verbs, prepositional words, and other kinds of phrases are acceptable. From this extracted phrase, database application 102 builds a clause. This clause will not have an assignment but will possibly have a grouping term instead, such as 'give me a maximum temperature of water . . . "

In some cases, database application 102 identifies a focus clause. A focus clause is a clause from NL query 120 that includes objects that the query is expected to return. One shorthand notation of a focus clause is "*".

Figure 4:
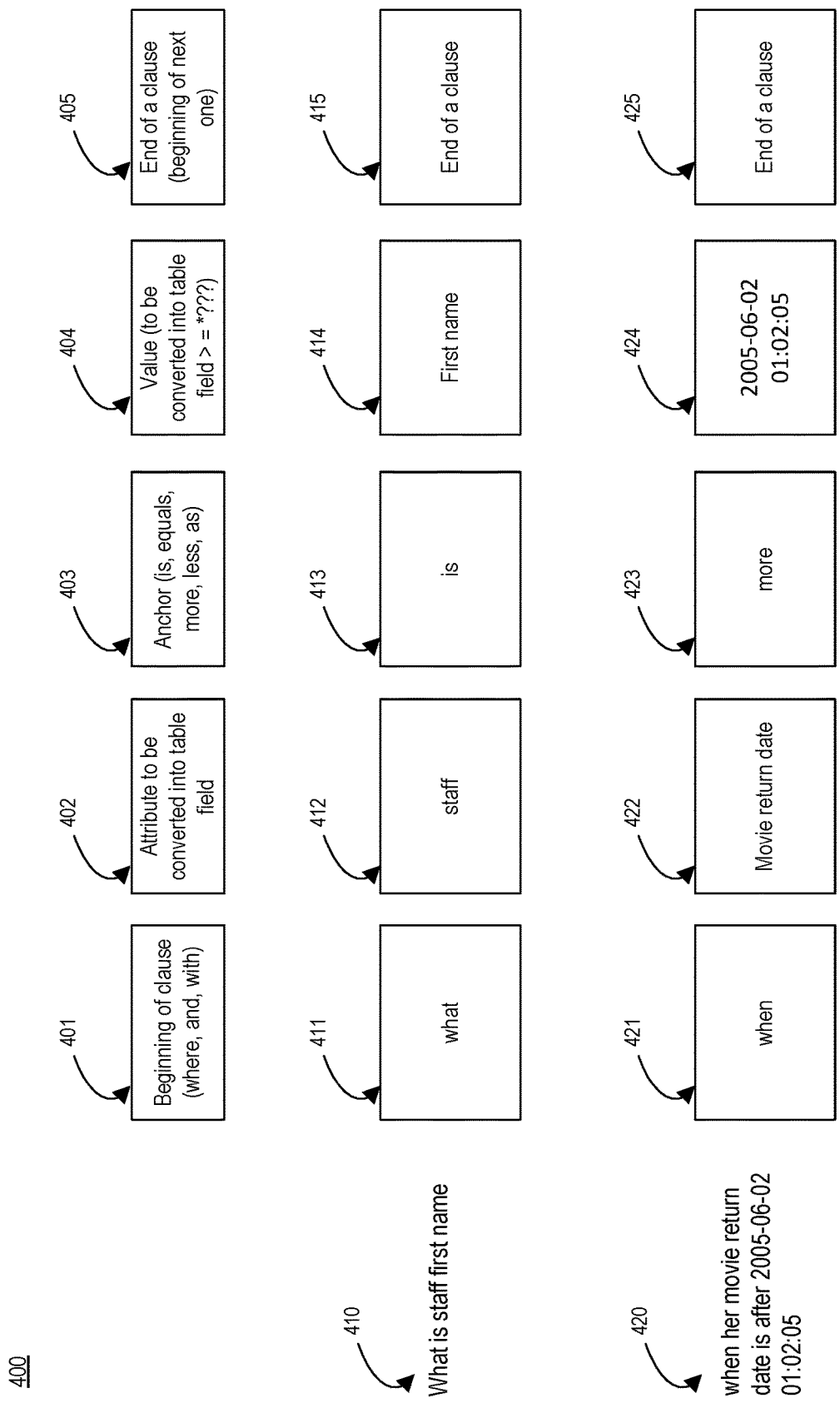
FIG. 4 is a diagram depicting an example of a process for clause extraction from a parse tree, in accordance with an aspect of the present disclosure.

Returning to FIG. 2, at block 203, process 200 involves extracting keywords from the clauses. Continuing the example, database application 102 extracts keywords from the clauses. FIG. 4 depicts one example of extracting clauses.

Once one or more clauses are identified, database application 102 considers the remaining of NL query 102 (on a clause basis) as a second clause that starts with "where".

Determining boundaries of clauses can be difficult. In some cases, therefore, database application 102 identifies the assignment and comparison word such as is, equals, more, before, as, that indicates a center of a phrase to be converted into a SQL clause. Once the leftmost anchor is identified, database application 102 attempts to build the left side, or the attribute and the right side, the value. Continuing the example, the attribute is "return rental date" and the value is the particular date.

To find the boundary of an attribute, database application 102 iterates towards the beginning NL query 120 to the start of a current phrase. The attribute is usually indicated by the prepositions with or of, connective and, or a "Wh" word. The value a is noun and/or a number, possibly with an adjective. The same words mark the end of value part as the beginning of next attribute part. For example, once the assignment or comparison word is removed or ignored, "return rental date" is adjacent to the actual date.

FIG. 4 is a diagram depicting clause extraction from a parse tree, in accordance with an aspect of the present disclosure. FIG. 4 depicts the mapping of the text depicted in FIG. 3. FIG. 4 includes word templates 401-405, clause 410 and words 411-415, and clause 420 and corresponding words 421-425. More specifically, word template 401 represents the beginning of the clause, word template 402 the attribute, word template 403 the anchor, word template 404 the value to be converted, and word template 405 the end of the clause.

Returning to FIG. 2, at block 204, process 200 involves mapping each keyword to a table, field, or operation of database. Database application 102 attempts to map each parse tree node to a SQL command, reference to a table, field or value. Such approach identifies the nodes in the linguistic parse tree that can be mapped to SQL components and tokenizes them into different tokens. In the mapping process, some nodes may fail in mapping to any SQL component. In this case, our system generates a warning to the user, telling her that these nodes do not directly contribute in interpreting her query. Also, some nodes may have multiple mappings, which causes ambiguities in interpreting these nodes. For each such node, the parse tree node mapper outputs the best mapping to the parse tree structure adjustor by default and reports all candidate mappings to the interactive communicator.

Database application 102 considers each phrase or keyword in the query and attempts to match to a table and/or a field within the table. Different levels of match are possible. For example, a keyword may match to a table name, a field within a table, multiple fields within multiple tables, and so on. Accordingly, database application 102 can use a hierarchical approach to determining a match.

Fundamentally, natural language is ambiguous and interpreting natural language is difficult. Therefore, determining which words refer to which database field is ambiguous in nature. For example, people often use slang words, technical terms, and dialect-specific phrasing, none of which may be known to a system. Even in human-to-human interaction, there are miscommunications.

For example, substituting values for attributes of similar semantic types, such as first and last name, can be difficult. For example, the following mapping is difficult, unless we know what first and last names are:
actor name John Doe⇒actor.first_name= . . . & actor.last_name= . . .

There is a need for transformations beyond mapping phrase2table.field, such as a lookup of English first names and knowledge that first and last name can be in a single field, can be in various formats and orders, or belong to distinct fields, like in the case of Sakila database (Oracle 2018).

When a user is saying 'film name' the system can interpret it as a table with field='name' when film.name does not exist. Although 'name' is a synonym of 'title', the phrase 'name' can be mapped into totally foreign table such as category.name instead of actor.first_name. If a phrase includes 'word1 word2' it is usually ambiguous since word2 can be table1.field and also table2. word2 can also be a field (or a part of a field, as a single word) in another table.

Hence, a hypothesis management process that proceeds from most likely to least likely cases is needed. We start with the rule that identify a single table name and make sure there are no other table names mentioned. Also, we need to confirm that no field name is mentioned.

Figure 5:
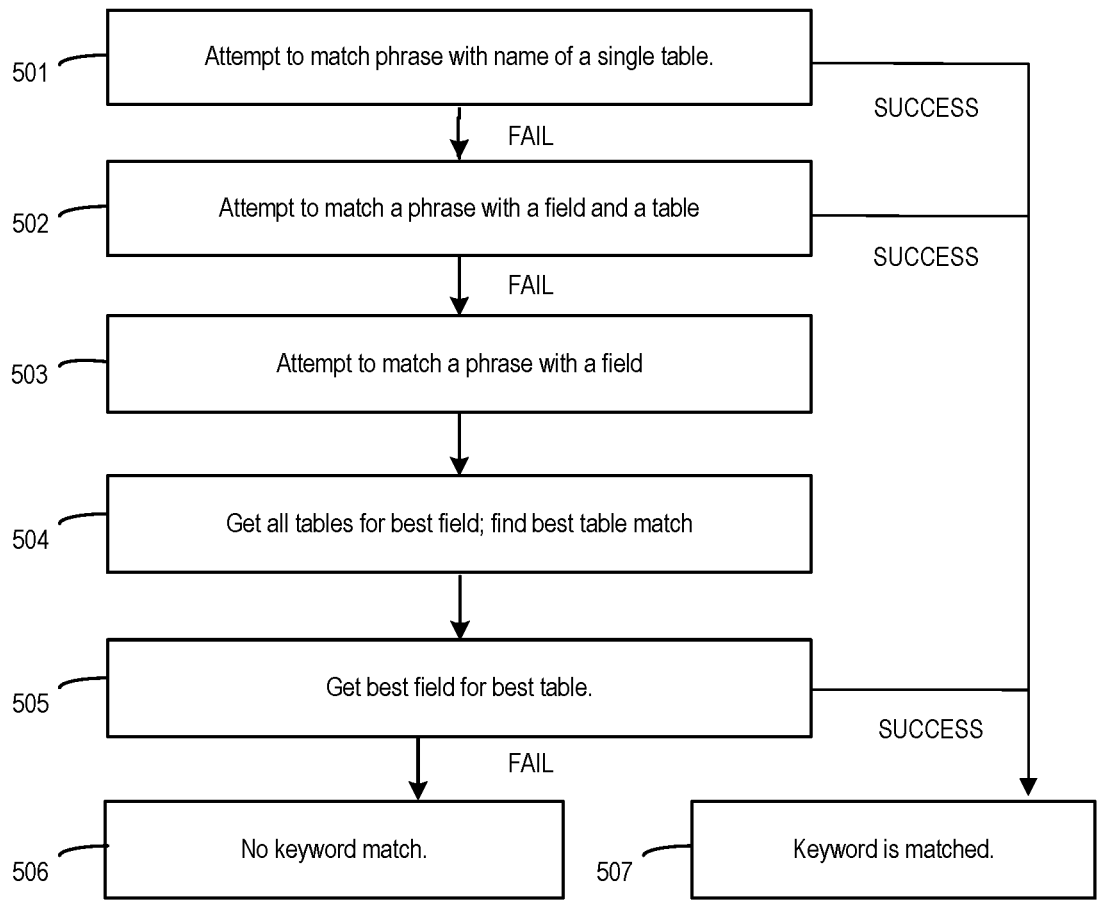
FIG. 5 is a diagram depicting matching keywords to database tables, in accordance with an aspect of the present disclosure.

FIG. 5 is a diagram depicting matching keywords to database tables, in accordance with an aspect of the present disclosure. Process 500 can be implemented by database application 102 or by another application. Matching keywords can occur one keyword at a time, that is, process 500 is executed once for each keyword. In other cases, matching can occur on the phrase level, that is several keywords together. For discussion purposes, process 500 is discussed with respect to a phrase.

Database application 102 attempts to match a phrase to a database table or field in a multi-step process. For example, database application 102 first attempts to match at block 501. If no match is found at block 501, then database application 102 attempts to match at block 502. If no match is found at block 502, then database application 102 attempts to match at block 503. The earlier the match is found in process 500, the higher the confidence level of the match.

At block 501, process 500 involves attempting to match a phrase with a name of a single table. A match occurs at block 501 if database application 102 determines that the phrase includes only the name of a single database table, but no other database tables. Once a table is confirmed, database application 102 selects the default field of the table, such as 'name' or any other field with the name of entity represented by this table. This selection is later used to generate the native query, e.g., at block 209. If the phrase does not match with any other table, then then process 500 stops and proceeds to block 507. Otherwise, process 500 proceeds to block 502.

At block 502, process 500 involves attempting to match a phrase with a field and a table. At block 502, database application 102 identifies a phrase match a table and a field of a table together. This match can be accomplished by iterating through all table and field words and selecting the combination of table and field pair that has a highest number of words with the phrase. Therefore, in this case, all of the words in a phrase need not match the database. Database application 102 can score the level of match using one or more techniques, e.g., number of matching words between phrase and table-field pair. Other techniques can be used.

Database application 102 matches a phrase using combined table and field expression with synonyms. If the score is a good match, then process 500 stops and proceeds to block 507. Conversely, if database application 102 does not find a good match for table-filed set of keywords against the phrase, process 500 proceeds to block 503.

At block 503, process 500 involves attempting to match a phrase with a field. Database application 102 attempts to match a field only (not a table label). More specifically, database application 102 involves iterating through fields of all tables. Database application 102 matches phrases using field expressions with synonyms. Whole word match and word form substitution matches can be used. Database application 102 selects the match with the best score.

Database application 102 can use an ontology (e.g., thesaurus 104) so expand a list of keywords for a field with synonyms. For example, thesaurus 104 can include mined database metadata such as table names, field names, tokens in table names, tokens in field names, and synonyms for each. Because terms in a NL query can deviate from field names in a database, synonyms are useful to improve matching. Synonyms can be mined from sources like thesaurus.com or use trained synonym models such as word2vec (Mikolov et al 2011). Lists of synonyms or similarity functions are then used to improve matching. If database application 102 obtains a high score, then process 500 proceeds to block 507. Otherwise, process 500 continues to block 504.

At block 504, process 500 involves obtaining all the tables for a best field. The best field match obtained at block 503. Database application 102 obtains all tables that include the best field.

At block 505, process 500 involves obtaining a best field match for a best table. Once best table is identified at block 504, database application 102 obtains all fields from the best table. Database application 102 then identify a best field match, including with synonym substitution.

At block 506, process 500 involves determining that a phrase has no match. At block 506, process 500 ends. Database application 102 proceeds to clarify the keyword ambiguity with the user.

At block 507, process 500 involves determining that a phrase is matched. Database application continues determine whether any additional unmapped keywords exist. If so, process 500 restarts. Otherwise, database application 102 creates the SQL query from the parse tree.

Returning to FIG. 2, at block 205, process 200 involves determining whether there are any unmapped keywords. After node mapping, database application 102 attempts to ensure that each node is understood by database application 102. If not, process 200 proceeds to block 206. If each node is mapped, then database application 102 proceeds to block 209.

At block 206, process 200 involves mapping keywords using a search-indexed database. This approach to building SQL query clauses can be referred to as a search engineering approach. In this approach, database application 102 accesses a custom database index and executes a search of a part of user NL query against the database.

Figure 6:
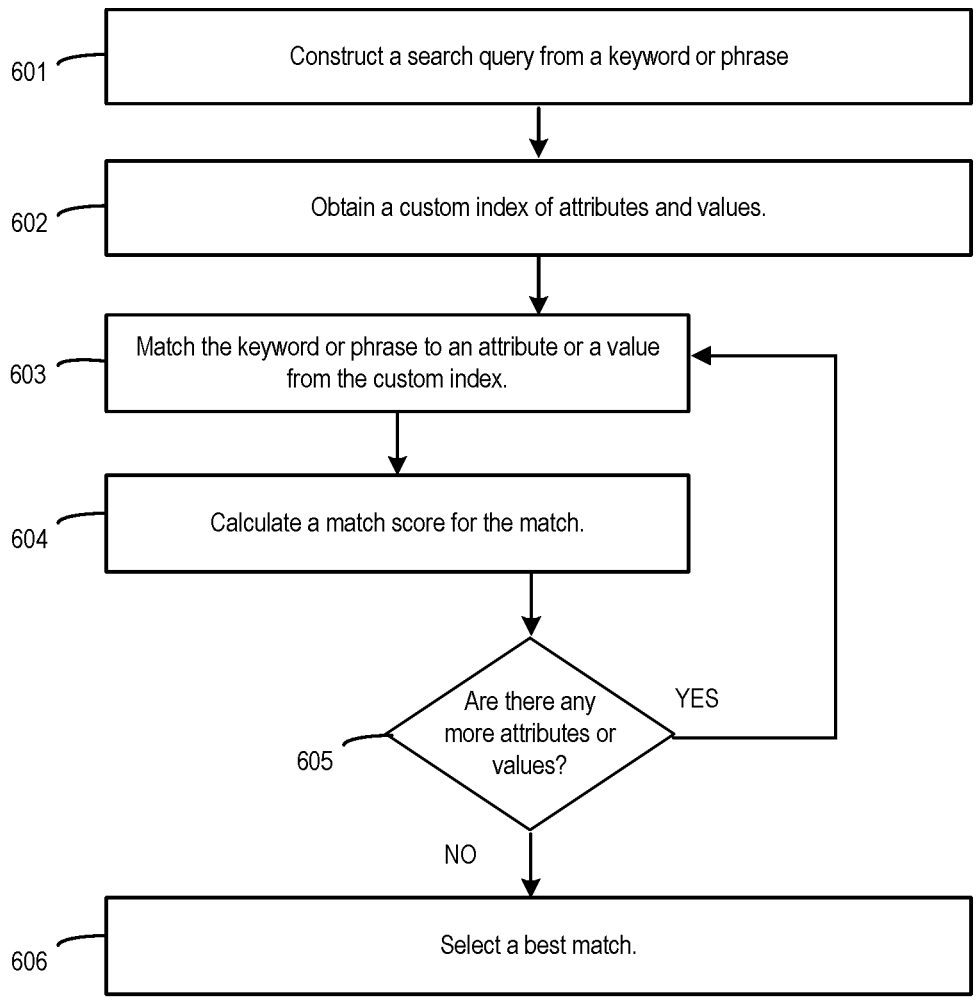
FIG. 6 is a diagram depicting a process for keyword matching to a database index, in accordance with an aspect of the present disclosure.

FIG. 6 is a diagram depicting a process 600 for keyword matching to database index, in accordance with an aspect of the present disclosure. Database application 102 can match clauses to phrases with an indexed row.

At block 601, process 200 involves constructing a query from a keyword or phrase. The query is used to search the custom database index. Database application 102 builds a search expression is built from the phrase or keyword that is identified as ambiguous in block 205. This search expression includes the words which are expected to match tables, fields and values. Because the database application 102 does not know the contents of the search results before they are obtained, the query is formed as conjunction of words first and then as a disjunction (logical OR) of these words, if the conjunction query fails to give results. In a disjunction queries, not all keywords have to be matched. To make the index search more precise, database application 102 also form span-AND queries from entities identified in the phrase to be converted, such as Bank of America.

Numbers need a special treatment. For a query of equal kind, finding an exact number would make SQL query formation precise and in fact substitutes an execution of a resultant query. Since all numbers are indexed for search as string tokens, real numbers need to be stored and searched with '.' substituted to avoid splitting string representation into two parts.

At block 602, process 200 involves obtaining a custom index. The custom index can include attributes and value. For example, database application 102 creates custom index 192. The custom index 192 includes the fields for search and the values of the fields. For example, database application 102 creates a format that includes each row of each table of database 190 in the following format: Table field1 value1 field2 value2 . . . etc. The custom index 192 can also include information from thesaurus 104, such as synonyms and relation names, as described herein. In some cases, the custom database index can be created and stored for later use, e.g., at runtime. In other cases, the custom database index can be created in the fly.

In some cases, not all of the database content is indexed. For example database application 102 can, in some cases, exclude associative tables and other tables which do not contain data for entities such as customer or address from indexing.

At block 603, process 200 involves matching the keyword or phrase to an attribute or value from the custom index. Database application 102 obtains one or more search results from searching the custom index.

At block 604, process 200 involves calculating a match score. Database application 102 can calculate a match score, which can be based on term frequency-inverse document frequency (TFIDF).

At block 605, process 200 involves determining whether there are any more attributes or values. If there are more attributes or values to search in the custom index, then process 600 returns to block 603 and iterates through additional matches to find the most likely record. If there are no more attributes or values, process 600 continues to block 606.

Figure 15:
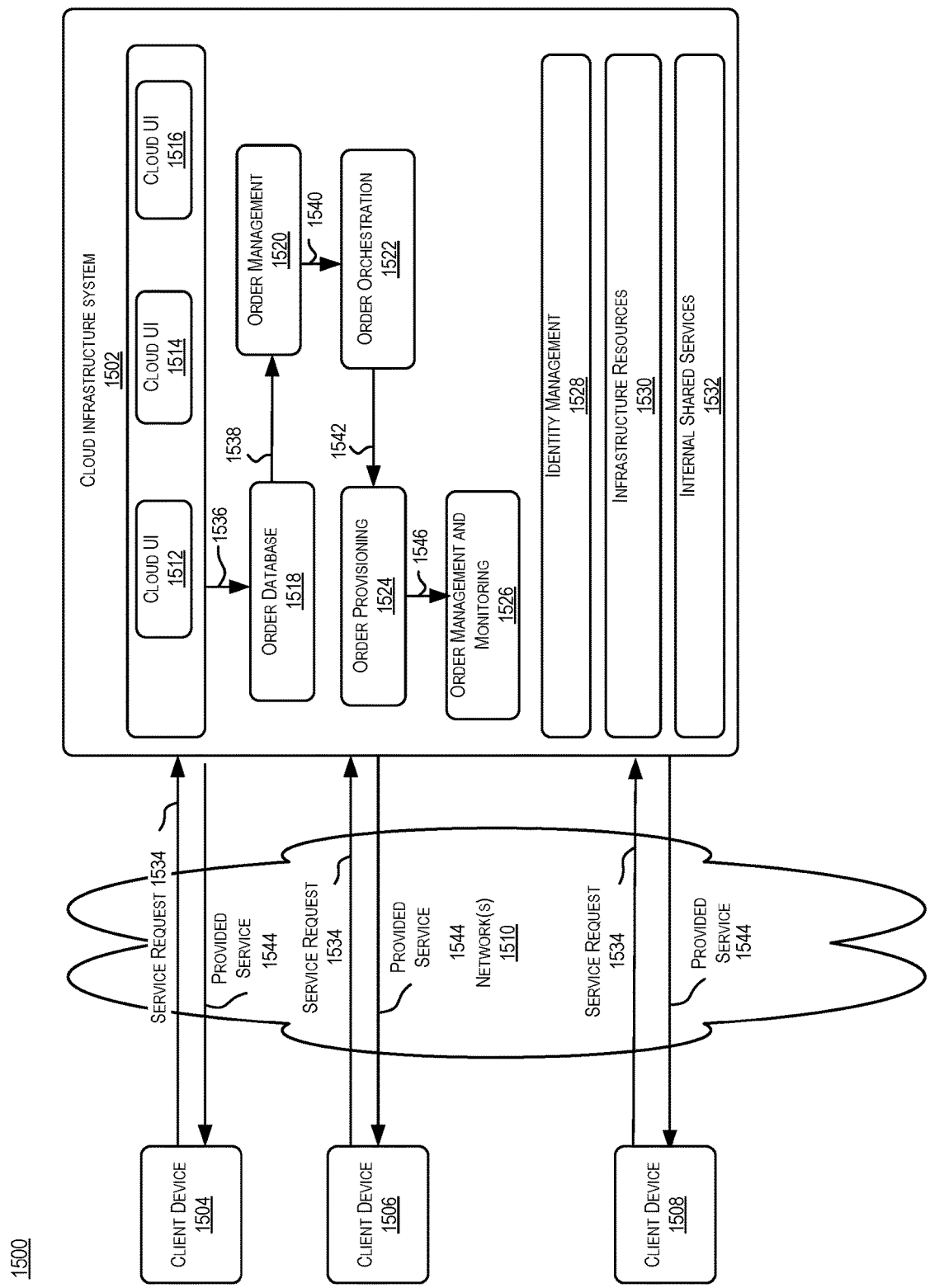
FIG. 15 is a simplified block diagram of components of a system environment by which services provided by the components of an aspect system may be offered as cloud services in accordance with an aspect.

At block 606, process 200 involves selecting a best match. Database application 102 Although the default TF*IDF relevance is usually right, we compute out own score based on the number of attribute-value pairs which occur in both the query and a candidate search result (FIG. 15). Our own score also takes into account individual values without attribute occurrence in both the query and the record. String-level similarity and multiword deviations between occurrences in the query and the record are also taken into account (whether some words in a multiword are missing or occur in a different form (such as plural for noun or a tense for a verb). Depending on the type of string for the value (numeric or string), database application 102 can select the operation '=' or 'like.'

Returning to FIG. 2, at block 207, process 200 involves determining whether there are any unmapped keywords. If there are still unmapped keywords, then process 200 continues to block 208. Otherwise, process 200 continues to block 209.

At block 208, process 200 involves clarifying ambiguities with the user device. Naturally, in many processing components, ambiguities arise, such as table name, field name or relationship. Instead of trying to find a most plausible representation of an NL query, like most of NL2SQL systems do, database application 102 relies on the user to resolve ambiguities via clarification requests. Our NL2SQL system gives user the query phrase being mapped into a table name, and enumerates possible tables, providing a clarification request.

At block 209, process 200 involves generating a database query. Based on the identified mappings, database application 102 generates a database query that includes all the mapped fields or attributes.

At block 210, process 200 involves providing the database query to database, obtain result from database, and provide result to user device. Database application 102 provides native query 150 to database 190.

Example Database

Figure 7:
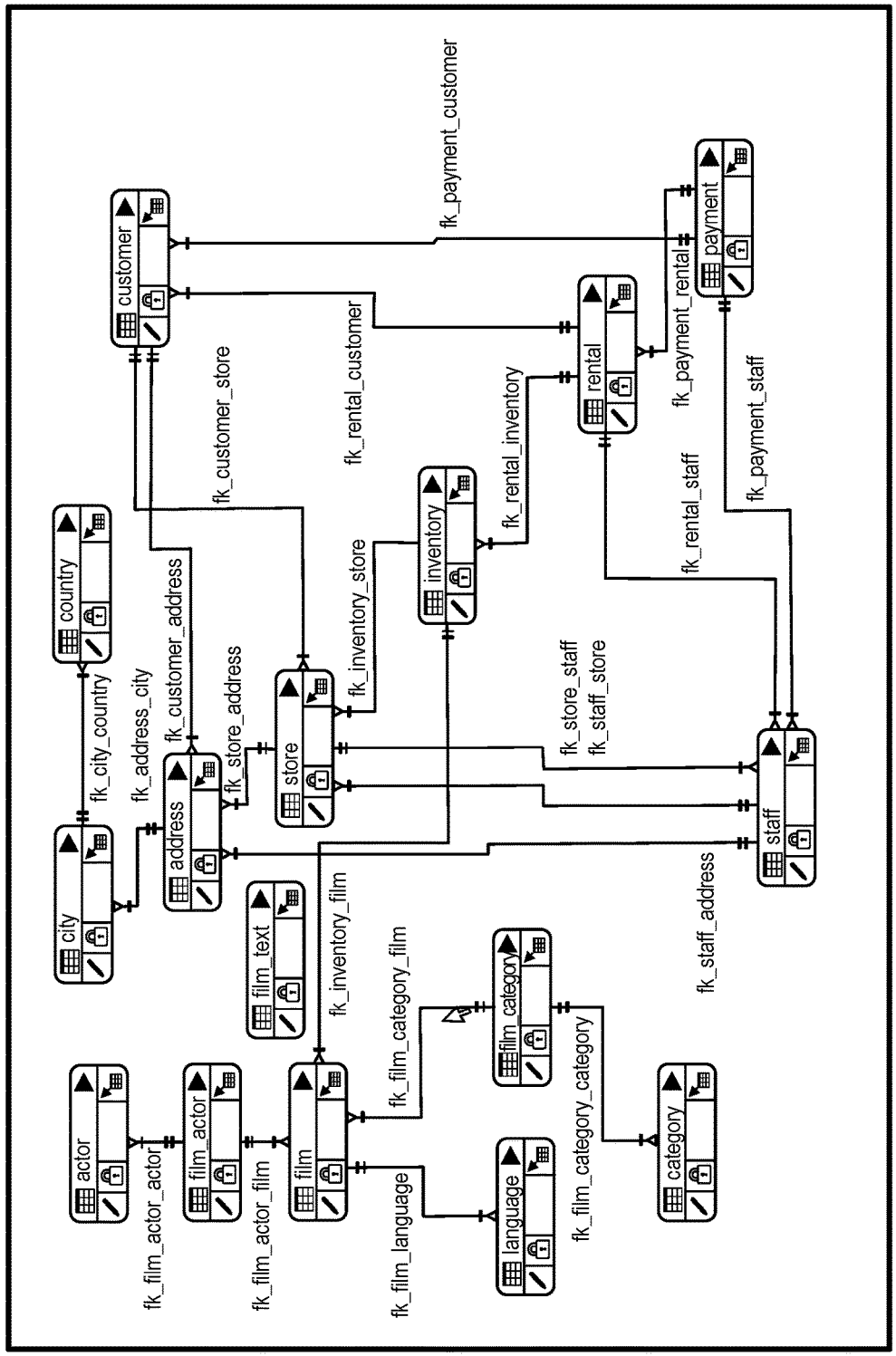
FIG. 7 is a diagram depicting an example of a database, in accordance with an aspect of the present disclosure.

FIG. 7 is a diagram depicting an example of a database, in accordance with an aspect of the present disclosure. FIG. 7 depicts a sample database enabled with NL2SQL. More specifically, FIG. 7 depicts a diagram of a database with relations for database tables relevant to the matching of parse tree 300 depicted in FIG. 3. FIG. 7 depicts database tables (e.g., "customer," "country," and "address") which are linked by different links (prefixed by "fk_", which refers to foreign key). Examples of such links are fk_customer address and fk_city_country. Examples of the NL query, logs for intermediate steps, and resultant SQL representation and query results are shown below.

Query: 'what is staff first name when her movie return date is after 2005 Jun. 2 01:02:05'
looking for table.field for '[staff, first, name]'
found table.field=staff.first_name
looking for table.field for '[movie, return, date]'
found table.field=rental.return_date
Results: Mike
SQL: select staff.first_name from staff, rental where rental.return_date>'2005 Jun. 2 01:02:05' and rental.staff_id=staff.staff_id Query: 'what film title has actor's first name as Christian and category Documentary'
looking for table.field for '[film, title]'
found table.field=film.title
looking for table.field for '[actor, first, name]'
found table.field=actor.first_name
Results: ACADEMY DINOSAUR|
CUPBOARD SINNERS|
MOD SECRETARY|
PRINCESS GIANT|
SQL: select film.title from film_category, film_actor, film, actor, category where actor.first_name like '% Christian %' and category.name='documentary' and
film_actor.film_id=film.film_id and
film_actor.actor_id=actor.actor_id and
film_actor.film_id=film.film_id and
film_actor.actor_id=actor.actor_id and
film_category.film_id=film.film_id and
film_category.category_id=category.category_id and
film_category.film_id=film.film_id and
film_category.category_id=category.category_id.

Query: 'What is actor fist name when movie category is Documentary and special features are Behind the Scenes'
looking for table.field for '[actor]'
found table.field=actor.first_name
looking for table.field for '[movie, category]'
found by table ONLY=category.name
Results: PENELOPE|
CHRISTIAN|
LUCILLE|
SANDRA|
SQL: select actor.first_name from film_category, film_actor, film, actor, category where category.name like '% Documentary %' and film.special_features like '% behind % the % scenes %' and film_actor.film_id=film.film_id and
film_actor.actor_id=actor.actor_id and
film_actor.film_id=film.film_id and
film_actor.actor_id=actor.actor_id and
film_category.film_id=film.film_id and
film_category.category_id=category.category_id and
film_category.film_id=film.film_id and
film_category.category_id=category.category_id.

A user device is not required to highlight specific parameter values versus names. In another example, the query could have been formulated as 'What is a category of film . . . ' but it would make it harder for NL2SQL system to determine the fields of the tables referred to by the words category and film.

Query: 'What is a film category when film title is Ace Goldfinger'
looking for table.field for '[film, category]'
found table.field=category.name
looking for table.field for '[film, title]'
found table.field=film.title
Results:
Horror|
SQL: select category.name from film_category, film, category where film.title like '% ACE GOLDFINGER %' and film_category.film_id=film.film_id and
film_category.category_id=category.category_id In many cases, when a reference to a table name is not mentioned in an NL query, database application 102 attempts to identify the table name based on a column name. If multiple tables have the same column name, database application 102 seeks clarification via the user interface. A user selects a single table from the list of ones with the column name.

Building an Improved Thesaurus for Autonomous Agents

Database application 102 can use an improved thesaurus in conjunction with the custom index to improve matching of NL search query 120 to database entries, thereby resulting in improved database, or SQL, queries. A scalable mechanism to build a thesaurus of entities which is intended to improve the relevance of an autonomous agent follows. The thesaurus construction process starts from the seed entities and mines available source domains for new entities associated with these seed entities. New entities are formed by applying the machine learning of syntactic parse trees (their generalizations) to the search results for existing entities to form commonalities between them. These commonality expressions then form parameters of existing entities, and are turned into new entities at the next learning iteration. To match natural language expressions between source and target domains, we use syntactic generalization, an operation which finds a set of maximal common sub-trees of constituency parse trees of these expressions.

Thesaurus and syntactic generalization are applied to relevance improvement in search and text similarity assessment. We conduct an evaluation of the search relevance improvement in vertical and horizontal domains and observe significant contribution of the learned thesaurus in the former, and a noticeable contribution of a hybrid system in the latter domain. We also perform industrial evaluation of thesaurus and syntactic generalization-based text relevance assessment and conclude that a proposed algorithm for automated thesaurus learning is suitable for integration into industrial systems.

In designing contemporary search engines and text relevance systems, it is hard to overestimate the role of thesauri for improving precision, especially in vertical domains.

Thesauri, thesauri and concept hierarchies are crucial components for many applications of Information Retrieval (IR), Natural Language Processing (NLP) and Knowledge Management (Cimiano et al 2004). However, building, tuning and managing thesauri and ontologies is rather costly since a lot of manual operations are required. A number of studies proposed the automated building of thesauri based on linguistic resources and/or statistical machine learning, including multiagent settings (Kerschberg et al 2003, Roth 2006, Kozareva et al, 2009, Simchez and Moreno 2008, Simchez 2010).

The majority of current approaches to automated thesaurus mining have not found industrial applications due to the insufficient accuracy of resultant search, limited expressiveness of representations of queries of real users, or high cost associated with the manual construction or editing of linguistic resources, and their limited adjustability. In this work we will take advantage of full-scale syntactic parsing, machine learning of its results, and web mining based on search engines, to build and evaluate industrial-quality thesauri. The proposed thesaurus learning algorithm aims to improve vertical search relevance and will be evaluated in a number of search-related tasks. The main challenge in building a thesaurus tree is to make it as deep as possible to incorporate longer chains of relationships, so more specific and more complicated questions can be answered.

Disclosed solutions implement a mechanism for using thesaurus trees for the deterministic classification of answers as relevant and irrelevant; implement an algorithm to automate the building of such a thesaurus for a vertical domain, given a seed of key entities; and design a domain-independent linguistic engine for finding commonalities/similarities between texts, based on parse trees.

Galitsky et al 2012 introduced the operation of syntactic generalization for a pair of sentences to measure their similarity, and we described the applications of this operation in search. In (Galitsky 2012), we presented applications in information retrieval and text classification, and in (Galitsky et al 2012), we introduced the generalization operation for a pair of paragraphs. In this study, we rely on syntactic generalization to build thesauri and to apply them at the time of the search. We briefly introduce a syntactic generalization operation in Section 4.

Our thesaurus-building algorithm is focused on search relevance improvement, unlike the majority of ontology mining methods, which optimize the precision and recall of the extracted relations. Therefore, the evaluation in this study will assess the algorithm's performance in terms of the search accuracy improvement and not the quality of the built thesaurus. Hence, we expect the search performance-driven thesaurus learning algorithm to outperform the algorithms that are focused on most of the relations or the most exact relations. Our evaluation will be conducted in vertical and horizontal searches as well as in an industrial environment with text similarity assessment.

Thesaurus building is approached from the standpoint of transfer learning paradigms (Raina et al. 2006, Pan and Yang 2010). Although we build our thesaurus to function in a vertical domain, a horizontal domain for web mining is required to build it. In the building of thesauri for chatbots, transfer learning can extract knowledge for a wide spectrum of web domains (auxiliary) and enhance thesaurus-based search in a target domain. For transfer learning to be successful, it is critical to compute the similarity between phrases in auxiliary and target domains, even when the mappings between phrases are not obvious. For that purpose, we use syntactic generalization as an extension of the bag-of-words approach. Here, we introduce a novel method for finding the structural similarity between sentences, to enable transfer learning at a structured knowledge level. In particular, we address the problem of how to learn a non-trivial structural (semantic) similarity mapping between phrases in two different domains when their vocabularies are completely different.

Figure 8:
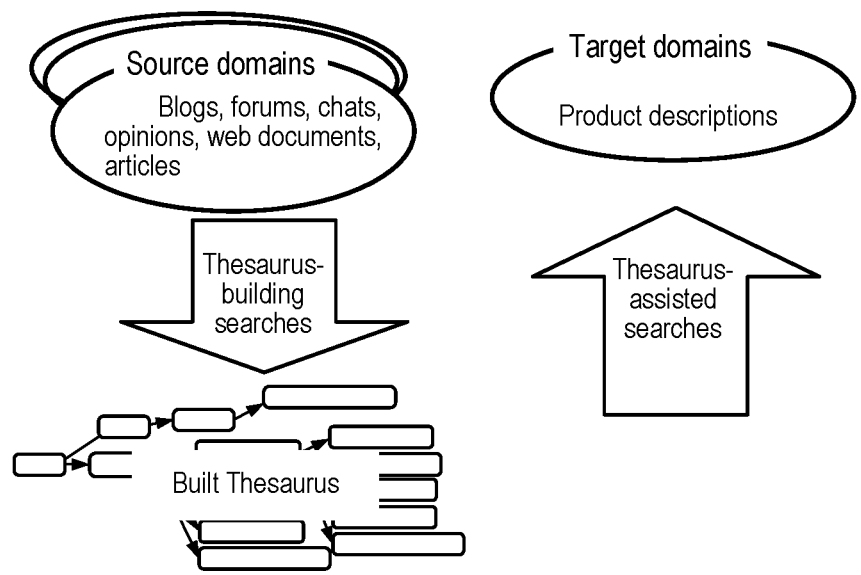
FIG. 8 depicts thesaurus-assisted search viewed from the standpoint of transfer learning, in accordance with an aspect of the present disclosure.

FIG. 8 depicts thesaurus-assisted search viewed from the standpoint of transfer learning, in accordance with an aspect of the present disclosure.

When building thesauri for vertical domains, it is usually not sufficient to mine web documents in this vertical domain only. Moreover, when a target domain includes social network data or micro-text, it is usually difficult to find enough of such data to build thesauri within the domain; as a result, transfer learning methodology is required, which mines a wider set of domains with similar vocabulary. The transfer learning then must be supported by matching syntactic expressions from distinct domains. In this study, we perform transfer learning on the level of constituency parse trees.

A number of currently available general-purpose resources, such as DBPEdia, Freebase, and Yago, assist entity-related searches but are insufficient to filter out irrelevant answers that concern a certain activity with an entity and its multiple parameters. A set of vertical ontologies, such as last.fm for artists, are also helpful for entity-based searches in vertical domains; however, their thesaurus trees are rather shallow, and their usability for recognizing irrelevant answers is limited.

In this study, we propose an automated thesaurus-building mechanism that is based on an initial set of main entities (a seed) for a given vertical knowledge domain. This seed is then automatically extended by the mining of web documents, which include a meaning for a current thesaurus node. This node is further extended by entities that are the result of inductive learning of commonalities between these documents. These commonalities are extracted using an operation of syntactic generalization, which finds the common parts of syntactic parse trees of a set of documents that were obtained for the current thesaurus node. Syntactic generalization has been extensively evaluated commercially to improve text relevance (Galitsky et al 2010, Galitsky et al 2011), and in this study, we also apply it in the transfer learning setting for the automated building of thesauri.

Proceeding from parsing to semantic level is an important task towards natural language understanding, and has immediate applications in tasks such as information extraction and question answering (Allen 1987, Ravichandran and Hovy 2002, Dzikovska 2005, Wang et al 2009). In the last ten years, there has been a dramatic shift in computational linguistics from manually constructing grammars and knowledge bases to partially or totally automating this process using statistical learning methods trained on large annotated or non-annotated natural language corpora. However, instead of using such corpora, in this paper, we use web search results for common queries, because their accuracy is higher and they are more up-to-date than academic linguistic resources in terms of specific domain knowledge, such as tax.

The value of semantically-enabling search engines for improving search relevance has been well understood by the commercial search engine community (Heddon 2008). Once an 'ideal' thesaurus is available, that properly covers all of the important entities in a vertical domain, it can be directly applied to filtering out irrelevant answers. The state-of-the-art in this area is how to apply a real-world thesaurus to search relevance improvement, where this thesaurus is automatically compiled from the web and therefore is far from being ideal. It has become obvious that lightweight keyword-based approaches cannot adequately tackle this problem. In this paper, we address this issue by combining web mining as a source of training sets, and syntactic generalization as a learning tool.

It is worth noting the relation between mining ontologies and mining thesauri. Ontology learning can be split into sub-steps, such as

- lexical entity extraction and concept extraction;
- thesaurus extraction, which is essential for search and is the subject of this study;
- non-taxonomic expression extraction, where discovered non-taxonomic relations are labeled by a knowledge engineer and become parts of an ontology. The proposed approach automatically forms multiple tree paths when multiple relations between the concepts 'Company' and 'Product' are detected in textual data, and multiple interpretations arise: a company might not only produce a product but also sell, consume, advertise, and promote the product.

The current transfer learning-based approach can be positioned among the tasks seeking unnamed relations in text, where co-occurrence analysis with limited attention to sentence structure is used, and the results are filtered via frequency measures. We improve this approach by systematic learning of whole sentence structures, and mining parse trees for relations instead of using the bag-of-words model.

Improving Agent Relevance by Thesauri

To answer a question that is natural language or keyword-based, it is beneficial to 'understand' what this question is about. In the sense of this chapter, this 'understanding' is a preferential treatment of keywords. We use the following definition of a relationship between a set of keywords and its element is-about (set-of-keywords, keyword).

For a query with keywords {a b c}, we understand that the query is about b if the queries {a b}, and {b c} are relevant or marginally relevant, and {a c} is irrelevant. Our definition of query understanding, which is rather narrow, is the ability to say which keywords in the query are essential (such as b in the above example), in such a way that without them the other query terms become meaningless; an answer that does not contain b is irrelevant to a query that includes b.

For example, in the set of keywords {computer, vision, technology}, {computer, vision}, {vision, technology—} are relevant, and {computer, technology} are not; as a result the query is about (vision). Note, if a set of keywords form a noun phrase or a verb phrase, it does not necessarily mean that the head or the verb is a keyword that this ordered set is about. In addition note that we can group words into phrases when they form an entity:
is-about({vision, bill, gates}, Ø); whereas,
is-about({vision, bill-gates, in-computing}, {bill-gates}).
We refer to a set of keywords as essential if it occurs on the right side of is-about.

To properly formalize the latter observation, we generalize is-about relations to the relation between a set of keywords and its subset. For query {a b c d}, if b is essential (is-about({a b c d}, {b}), c can also be essential when b is in the query such that {a b c}, {b c d}, {b c} are relevant, and even {a b}, {b d} are (marginally) relevant. However, {a d} is not (is-about({a b c d}, {b,c}).

Thesauri are required to support query understanding. Thesauri facilitate the assessments of whether a specific match between a query and an answer is relevant or not, based on the above notion of query understanding via the is-about relation. Hence for a query q={a b c d} and two answers (snippets) {b c d . . . e f g} and {a c d . . . e f g}, the former is relevant and the latter is not. Thesauri in the sense of this paper can be viewed as tree coding of a set of inter-connected is-about relations.

Logical properties of sets of keywords and logical forms that express meanings of queries are explored in (Galitsky 2003). There is a systematic way to treat the relative importance of keywords via default reasoning (Galitsky 2005); multiple meanings of keyword combinations are represented via operational semantics of default logic.

Achieving relevancy using a thesaurus is based on a totally different mechanism compared with a conventional TF*IDF based search. In the latter, the importance of the terms is based on the frequency of occurrence. For an NL query (not a Boolean query), any term can be omitted in the search result if the remaining terms give an acceptable relevancy score. In the case of a Boolean query, this statement is true for each of its conjunctive members. In a thesaurus-based search, we know which terms should occur in the answer and which terms must occur there; otherwise, the search result becomes irrelevant.

Thesaurus-Based Answer Selection

To use a thesaurus to filter out irrelevant answers, we search for a thesaurus path (down to a leaf node, if possible) that is closest to the given question in terms of the number of entities from this question. Then, this path and leaf node most accurately specifies the meaning of the question, and constrains which entities must occur and which should occur in the answer, to be considered relevant. If the n-th node entity from the question occurs in the answer, then all k<n entities should occur in it as well.

For a thesaurus-supported search, we use two conditions:
- Acceptability condition. It verifies that all of the essential words from the query that exist in a thesaurus path are also in the answer.
- Maximum relevance condition. It finds words from the query that exist in a thesaurus path and are in the answer. It then computes the score based on the number of found essential and other keywords.

For the majority of search applications, the acceptability condition is easier to apply than the Maximum relevance condition: An answer $a_i \in A$ is acceptable if it includes all of the essential (according to is_about) keywords from question Q, as found in the thesaurus path $T_p \in T$. For any thesaurus path $T_p$ that covers the question q (the intersections of their keywords is not empty), these intersection keywords must be in the acceptable answer $a_i$.
$\forall T_p \in T: T_p \cap q \neq \emptyset \Rightarrow a_i \supseteq T_p \cap q$
For the best answer (most accurate) we write
$a_{best}: \exists T_p \max(\text{cardinality}(a_i \cap (T_p \cap q)))$
A thesaurus-based relevance score can be defined as the value of the cardinality $(a_i \cap (T_p \cap q)$, which is computed for all $T_p$ that cover q. Then, the best answer Score $(a_{best}) = \max \{a_i\} T_p$ (cardinality $(a_i \cap (T_p \cap q))$) is found among the scores for all of the answers A. The thesaurus-based score can be combined with the other scores such as the TF*IDF, the temporal/decay parameter, location distance, pricing, linguistic similarity, and other scores for the resultant ranking, depending on the search engine architecture. In our evaluation, we will be combining this score with the linguistic similarity score.

For a sentence (a set of keywords) s and a thesaurus path $T_p$, $s \cap T_p$ is the operation of finding a set of keywords that are the labels of a path $T_p$ in thesaurus T. In general, there are a number of thesaurus paths that cover a given question q, and each result of $s \cap T_p$ must be intersected with a question. Having multiple paths that cover a given query q means that this query has multiple meanings in this domain; for each such meaning a separate set of acceptable answers is expected.

Hence, the reader can see that the thesauri are designed to support computing the is_about relation. Given a query q and a thesaurus T, we find the path $T_p$ in such a way that is_about(q, $T_p \cap q$).

Let us consider the thesaurus example of for the query 'How can tax deduction be decreased by ignoring office expenses', q={how, can, tax, deduct(ion), decreas(ed)-by, ignor(ing), office, expense} and A={
a1={deduct, tax, business, expense, while, decreas(ing), holiday, travel, away, from, office},
a2={pay, decreas(ed), sales-tax, return, trip, from, office, to, holiday, no, deduct(ion)},
a3={when, file, tax, return, deduct, decrease-by, not, calculate, office, expense, and, employee, expense}}).

We will not consider tokenization and word form normalization issues in our examples, and we will show endings in brackets for convenience. Note that, in terms of keyword overlap, a1, a2 and a3 all look like good answers.

For q, we have this query covered by $T_p$={<tax>-<deduct>-<decrease-by>-<office-expense>}. Let us calculate the thesaurus score for each answer:
score(a1)=cardinality($a_1 \cap (T_p \cap q)$)=cardinality({tax, deduct})=2;
score(a2)=cardinality({tax, deduct, sales_tax})=3;
socre(a3)=cardinality({tax, deduct, decrease-by, office-expense})=3; Note that this answer is the only answer that passes the acceptability criterion.

Our next example concerns the disambiguation problem. For a question
q="When can I file an extension for the time for my tax return?"
let us imagine two answers:
a1="You must file form 1234 to request a 4 month extension of time to file your tax return"
a2="You must download a file with the extension pdf, complete it, and print it to do your tares".

Figure 9:
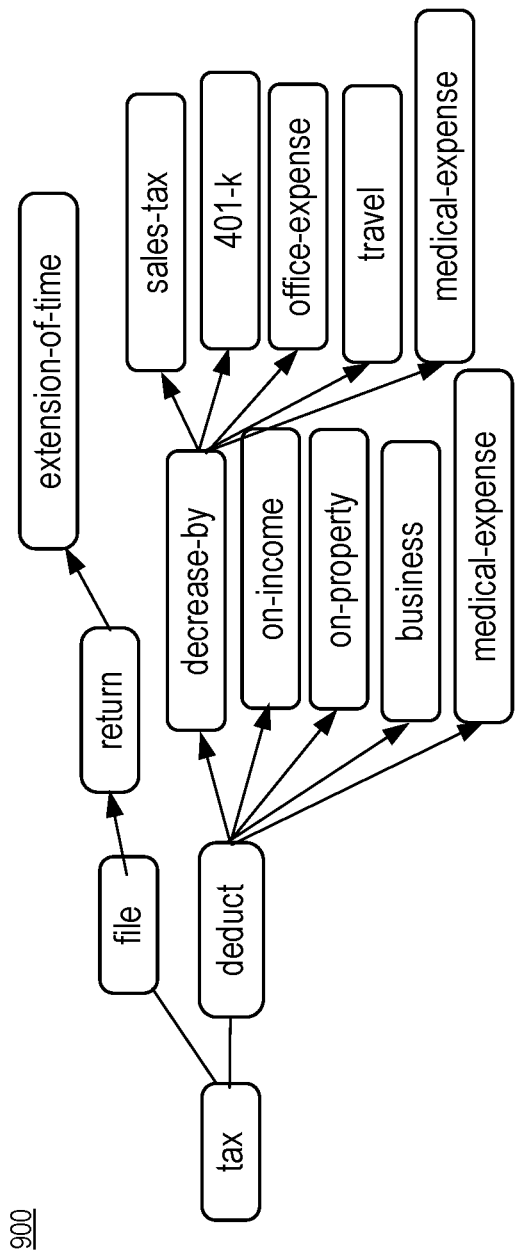
FIG. 9 depicts an example of a snapshot of a thesaurus, in accordance with an aspect of the present disclosure.

FIG. 9 depicts an example of a snapshot of a thesaurus, in accordance with an aspect of the present disclosure. For example, FIG. 9 depicts various relationships such as a relationship between "tax" and "deduct." We expect the closest thesaurus path to be:
$T_p$={<tar>-<file>-<return>-<extension-of-time>}
Here, tax is a main entity, file and return we expect to be in the seed, and extension-of-time would be the learned entity; as a result, a1 will match with thesaurus and is an acceptable answer, and a2 is not. Another way to represent thesaurus is not to enforce it to be a tree (least general) but to allow only single node for each label instead.

Thesaurus-Based Relevance Verification Process

An example process receives query q, runs a search (outside of this algorithm), obtains a set of candidate answers a and finds the best acceptable answer according to the definitions that we introduced in the previous section.
The input: query q
The output: the best answer $a_{best}$
1) For a query q, obtain a set of candidate answers A by the available means (using keywords, using an internal index, or using an external index of search engine APIs);
2) Find a path in thesaurus $T_p$ that covers maximal terms in q, along with other paths that cover q, to form a set P={$T_p$}. Unless an acceptable answer is found:
3) Compute the set $T_p \cap q$.
For each answer $a_i \in A$
4) compute $a_i \cap (T_p \cap q)$) and apply an acceptability criterion.
5) compute the score for each $a_i$.
6) compute the best answer $a_{best}$ and the set of acceptable answers $A_a$.
If no acceptable answer is found, then return to 2 for the next path from P.
7) Return $a_{best}$ and the set of acceptable answers $A_a$ if available.

Thesaurus Construction as a Process of Learning and Web Mining

Our main hypotheses for automated learning thesauri on the web is that common expressions between search results for a given set of entities give us parameters of these entities. Formation of the thesaurus follows an unsupervised learning style, once the set of seed thesaurus entities is given. This approach can be viewed as a human development process, where a baby explores a new environment and forms new rules. The initial set of rules is set genetically, and the learning process adjusts these rules to a specific habituation environment to make the rules more sensitive (and therefore allows more beneficial decision making). As new rules are being accepted or rejected during their application process, exposure to new environments facilitates formation of new specific rules. After the new, more complex rules are evaluated and some portion of these newly formed rules is accepted, the complexity of the rules grows more, to adapt to additional peculiarities of the environment.

We learn new entities to extend our thesaurus in a similar learning setting. The thesaurus learning process is iterative: at each new learning step, we add new edges to the nodes that are currently terminal. We start with the seed thesaurus, which enumerates a few of the main entities of a given domain and the relations of these entities with a few domain-determining entities. For example, the seed for the tax domain will include the relationships
tax-deduct tax-on-income tax-on-property,
where tax is a domain-determining entity and {deduct, income, property} are the main entities in this domain. The objective of thesaurus learning is to acquire further parameters of existing entities such as tax-deduct. In the next iteration of learning these parameters will be turned into entities, to enable a new set of parameters to be learned, such as sales-tax, 401 kn.

Each learning iteration is based on web mining. To find parameters for a given set of tree leaves (current entities), we go to the web and search for common expressions between the search results (snippets) for the query formed for the current tree paths. For the example above, we search for tax-deduct, tax-on-income, and tax-on-property and extract words and expressions that are common among the search results. Common words are single verbs, nouns, adjectives and even adverbs, prepositional phrases or multi-words in addition to prepositional, noun and verb phrases, which occur in multiple search results. Section 4 explains how to extract common expressions between search results and form a new set of current entities (thesaurus leaves).

After such common words and multi-words are identified, they are added as new entities to the list of existing entities. For example, for the path tax-deduct newly learned entities can be
tax-deduct→decrease-by tax-deduct→of-income
tax-deduct→property-of tax-deduct→business
tax-deduct→medical-expense.
The format here is existing_entity→its parameter (to become a new_entity);
where '→' here is an unlabeled edge of the thesaurus extension at the current learning step.

Next, from the path in the thesaurus tree tax-deduct, we obtain five new paths. The next step is to collect the parameters for each path in the new set of leaves for the thesaurus tree. In our example, we run five queries and extract parameters for each of them. The results will resemble the following:

tax-deduct-decrease-by→sales
tax-deduct-decrease-by→401-K
tax-deduct-decrease-by→medical
tax-deduct-of-income→rental
tax-deduct-of-income→itemized
tax-deduct-of-income→mutual-funds For example, searching the web for tax-deduct-decrease allows the discovery of an entity sales-tax, which is associated with a decrease in a tax deduction, usually with the meaning 'sales tax'. The commonality between snippets shows that the sales tax should be accounted for while calculating tax deduction; and not doing something that would decrease it.

Hence, the thesaurus is built via inductive learning from web search results in an iterative mode. We start with the thesaurus seed nodes, and then we find web search results for all of the currently available graph paths. Next for each commonality found in these search results, we augment each of the thesaurus paths by adding respective leaf nodes. In other words, for each iteration, we discover the list of parameters for each set of currently available entities, and then, we turn these parameters into entities for the next iteration.

The thesaurus seed is formed manually or can be compiled from available domain-specific resources. Seed thesaurus should contain at least 2-3 nodes, to enable the thesaurus growth process to have a meaningful start. A thesaurus seed can include, for example, a glossary of specific knowledge domain, readily available for a given vertical domain, such as investopedia afor tax entities.

FIG. 10 depicts an example search results, in accordance with an aspect of the present disclosure.

Thesaurus-Building Algorithm

We outline the iterative algorithm, which takes a thesaurus with its terminal nodes and attempts to extend the terminal nodes via web mining to acquire a new set of terminal nodes. At the iteration k, we acquire a set of nodes by extending the current terminal node $t_i$ with $t_{ik1}, t_{ik2} \ldots$. This algorithm is based on the operation of generalization, which takes two texts as sequences <lemma(word), part-of-speech> and gives the least general set of text in this form. We outline the iterative step:

Input: Thesaurus $T_k$ with Terminal Nodes $\{t_1, t_2 \ldots t_n\}$
A threshold for the number of occurrences to provide sufficient evidence for inclusion into $T_k$: th(k, T).
Output: extended thesaurus $T_{k+1}$ with terminal nodes $\{t_{1k1}, t_{1k2} \ldots, t_{2k1}, t_{2k2}, \ldots t_{nk1}, t_{nk2}\}$ For Each Terminal Node $t_i$ 1) Form a search query as a path from the root to $t_i$, $q = \{t_{root}, \ldots, t_i\}$;
2) Run a web search for q and obtain a set of answers (snippets) $A_q$.
3) Compute a pair-wise generalization (Section 4) for the answers $A_q$:
$\Lambda(A_q) = a_1 \hat{\ } a_2, a_1 \hat{\ } a_3, \ldots, a_1 \hat{\ } a_m, \ldots, \ldots, a_{m-1} \hat{\ } a_m,$
4) Sort all of the elements (words, phrases) of $\Lambda(A_q)$ in descending order of the number of occurrences in $\Lambda(A_q)$. Retain only the elements of $\Lambda(A_q)$ with the number of occurrences above a threshold th(k, T). We call this set $\Lambda^{high}(A_q)$.
5) Subtract the labels from all of the existing thesaurus nodes from $\Lambda^{high}(A_q)$:
$\Lambda^{new}(A_q) = \Lambda^{high}(A_q) / T_k$
6) For each element of $\Lambda^{high}(A_q)$, create a thesaurus node $t_{ihk}$, where $h \in \Lambda^{high}(A_q)$, and k is the current iteration number, and add the thesaurus edge $(t_i, t_{ihk})$ to $T_k$.

The default value of th(k, T) is 2. However, there is an empirical limit on how many nodes are added to a given terminal node at each iteration. This limit is 5 nodes per iteration; as a result, we take the five highest numbers of occurrences of a term in distinct search results. This constraint helps maintain the tree topology for the thesaurus that is being learned.

Given the algorithm for the iteration step, we apply it to the set of main entities in the first step, to build the whole thesaurus:

Input: Thesaurus $T_o$ with nodes $\{t_1, t_2 \ldots t_n\}$, which are the main entities
Output: Resultant thesaurus T with terminal nodes
Iterate through k:
Apply iterative step to k
If $T_{k+1}$ has an empty set of nodes to add, then stop
An Example of Thesaurus Learning Session We will now illustrate the algorithm introduced above. Let us imagine that we have a seed expression tax-deduct.

FIG. 11 depicts thesaurus learning, in accordance with an aspect of the present disclosure.

FIG. 12 depicts thesaurus learning, in accordance with an aspect of the present disclosure.

We will perform the following four steps:
1) Obtain search results for the currently available expressions.
2) Select attributes based on their linguistic occurrence. The number of occurrences should be above a specific threshold (and above 2).
3) Find common attributes (commonalities between the search results, highlighted in dark-grey, such as 'overlook').
4) Extend the thesaurus path by adding the newly acquired attribute The learning steps now are as follows:
1) Obtain search results for "tar deduct overlook";
2) Select attributes (modifiers of entities from the current thesaurus path)
3) Find common expressions, such as 'PRP-mortgage' in our case
4) Extend the thesaurus path by adding newly acquired attributes
Tax-deduct-overlook-mortgage,
Tax-deduct-overlook-no_itemize.

FIG. 13 depicts thesaurus learning, in accordance with an aspect of the present disclosure.

Having built the full thesaurus, we can now apply it to filter out search results that do not cover the thesaurus paths properly. For a query 'can I deduct tax on mortgage escrow account' we obtain the following hits, two of which are irrelevant (shown in an oval frame), because they do not include the thesaurus nodes (deduct, tax, mortgage, escrow_account). Note the closest thesaurus path to the query is tax-deduct-overlook-mortgage-escrow_account.

Thesaurus Snapshot

Sell_hobby=>[[deductions, collection], [making, collection], [sales, business, collection], [collectibles, collection], [loss, hobby, collection], [item, collection], [selling, business, collection], [pay, collection], [stamp, collection], [deduction, collection], [car, collection], [sell, business, collection], [loss, collection]]

benefit=>[[office, child, parent], [credit, child, parent], [credits, child, parent], [support, child, parent], [making, child, parent], [income, child, parent], [resides, child, parent], [taxpayer, child, parent], [passed, child, parent], [claiming, child, parent], [exclusion, child, parent], [surviving, child, parent], [benefits, child, parent], [reporting, child, parent],
hardship=>[[apply, undue], [taxpayer, undue], [irs, undue], [help, undue], [deductions, undue], [credits, undue], [cause, undue], [means, required, undue], [court, undue].
Three sets of paths for the tax topic entities sell hobby, benefit, hardship For each entity, given the sequence of keywords, the reader can reconstruct the meaning in the context of the tax domain. This snapshot illustrates the idea of thesaurus-based search relevance improvement: once the specific meaning (content, thesaurus path in our model) is established, we can find relevant answers. The head of the expression occurs in every path that it yields (for example {sell_hobby-deductions-collection), (sell_hobby-making-collection}).

Figure 14:
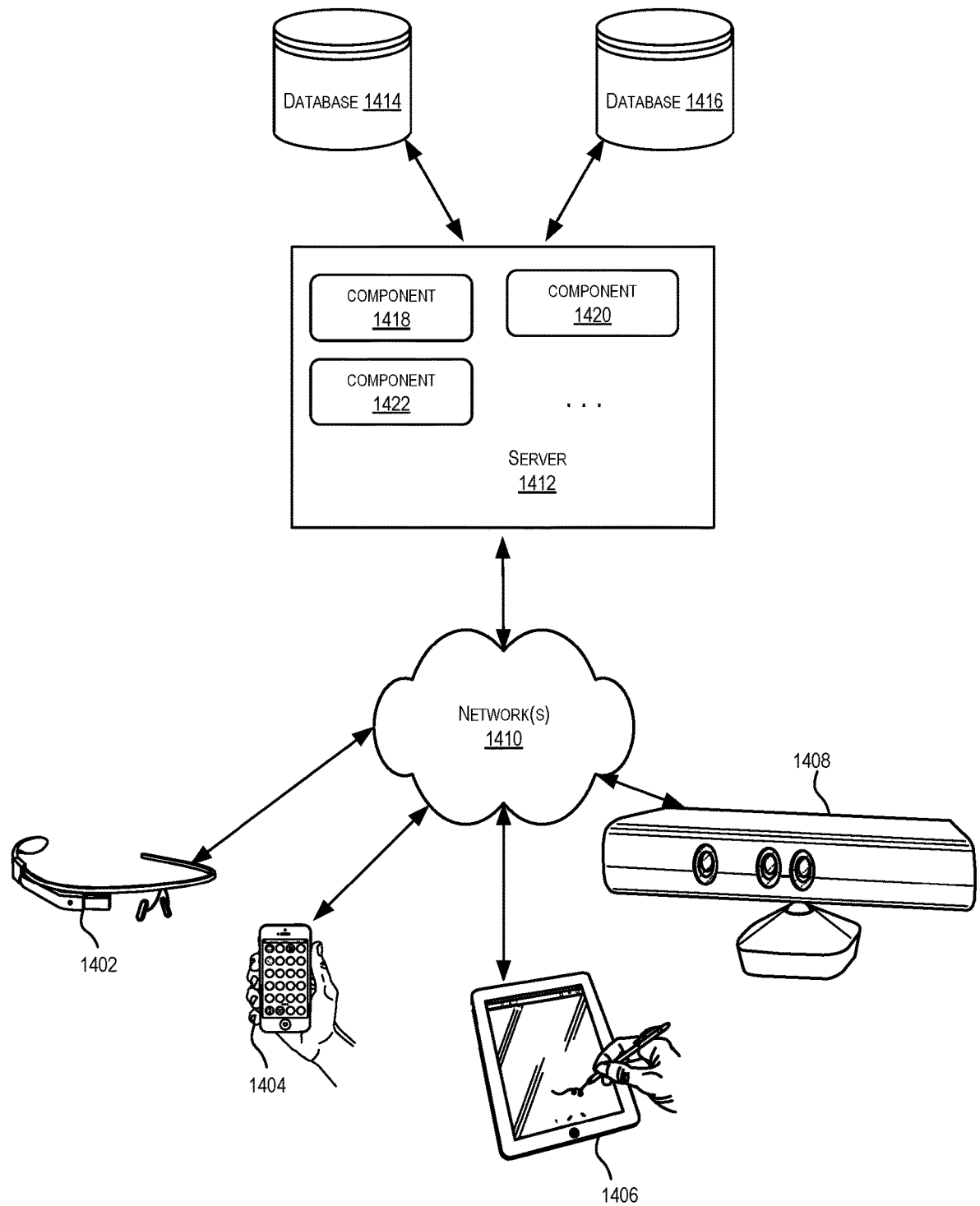
FIG. 14 depicts a simplified diagram of a distributed system for implementing one of the aspects.

FIG. 14 depicts a simplified diagram of a distributed system 1400 for implementing one of the aspects. In the illustrated aspect, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various aspects, server 812 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of distributed system 1400 are shown as being implemented on server 812. In other aspects, one or more of the components of distributed system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The aspect shown in the figure is thus one example of a distributed system for implementing an aspect system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.14 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1412 can include one or more virtual machines running virtual operating systems, or other computing architectures involving virtualization. One or more flexible pools of logical storage devices can be virtualized to maintain virtual storage devices for the server. Virtual networks can be controlled by server 1412 using software defined networking. In various aspects, server 1412 may be adapted to run one or more services or software applications described in the foregoing disclosure. For example, server 1412 may correspond to a server for performing processing described above according to an aspect of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of aspects, databases 1414 and 1416 may reside in a storage-area network (SAN). Similarly, any necessary files for performing the functions attributed to server 1412 may be stored locally on server 1412 and/or remotely, as appropriate. In one set of aspects, databases 1414 and 1416 may include relational databases, such as databases provided by Oracle, that are adapted to store, update, and retrieve data in response to SQL-formatted commands.

FIG. 15 is a simplified block diagram of one or more components of a system environment 1500 by which services provided by one or more components of an aspect system may be offered as cloud services, in accordance with an aspect of the present disclosure. In the illustrated aspect, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the aspect shown in the figure is only one example of a cloud infrastructure system that may incorporate an aspect of the disclosure. In some other aspects, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols, including those described above for network(s) 2810.

Cloud infrastructure system 1502 may comprise one or more computers and/or servers that may include those described above for server 1415.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data.

Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some aspects, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some aspects, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1502 may also include infrastructure resources 1530 for providing the resources used to provide various services to customers of the cloud infrastructure system. In one aspect, infrastructure resources 1530 may include pre-integrated and optimized combinations of hardware, such as servers, storage, and networking resources to execute the services provided by the PaaS platform and the SaaS platform.

In some aspects, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1502 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1502, and the like.

In one aspect, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain aspects, the customer may access a cloud User Interface (UI), cloud UI 1515, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1515, 1514 and/or 1516.

At operation 1536, the order is stored in order database 1518. Order database 1518 can be one of several databases operated by cloud infrastructure system 1502 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain aspects, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain aspects, cloud infrastructure system 1500 may include an identity management module 1528. Identity management module 1528 may be configured to provide identity services, such as access management and authorization services in cloud infrastructure system 1500. In some aspects, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
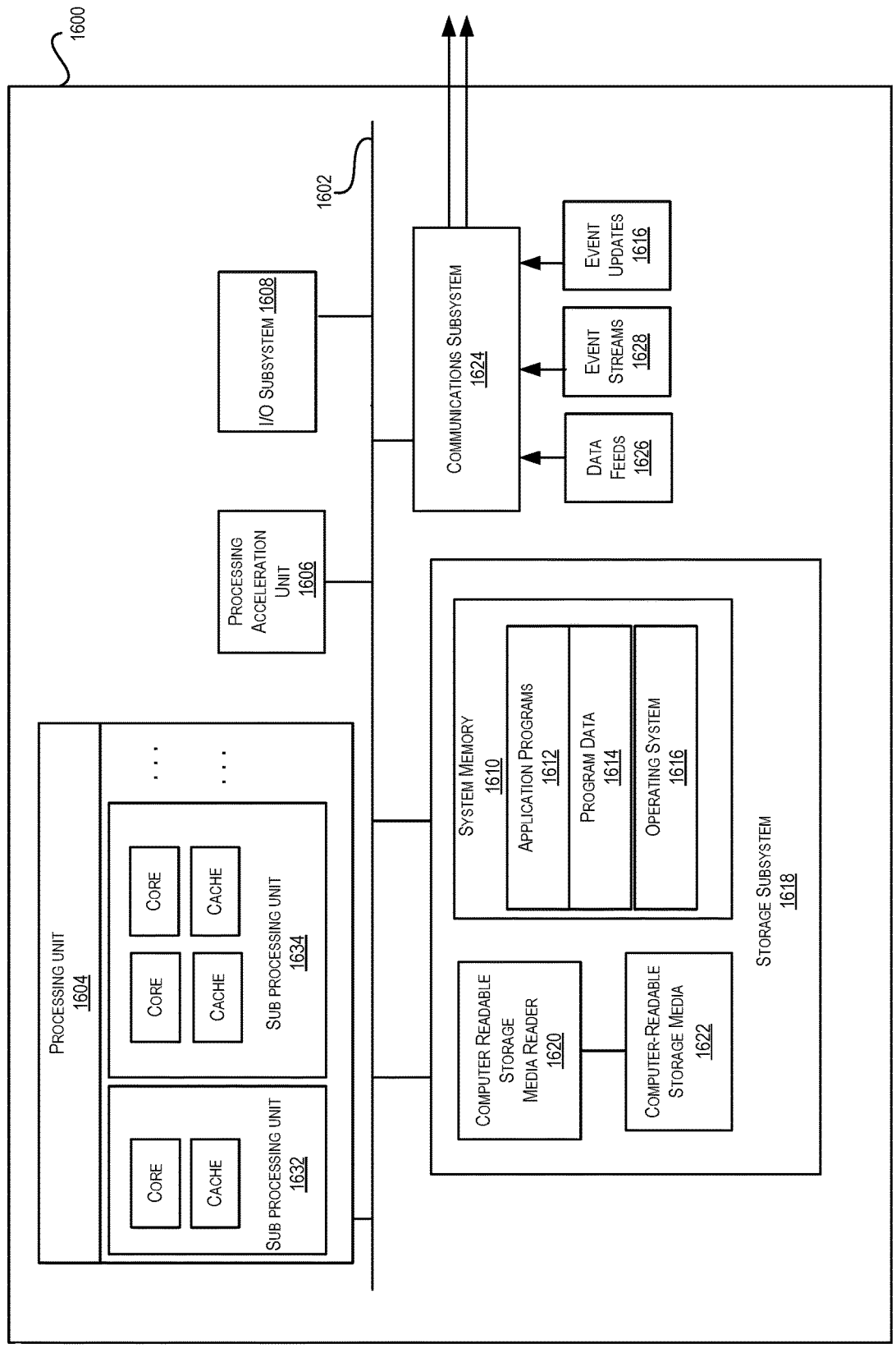
FIG. 16 illustrates an exemplary computer system, in which various aspects of the present disclosure may be implemented.

FIG. 16 illustrates an exemplary computer system 1600, in which various aspects of the present disclosure may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative aspects of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1686.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain aspects, processing unit 1604 may be implemented as one or more independent processing units 1632 and/or 1634 with single or multicore processors included in each processing unit. In other aspects, processing unit 1604 may also be implemented as a quad-core processing unit formed by integrating two dual-core processors into a single chip.

In various aspects, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some aspects. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1618 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1618.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some aspects, communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1624 can provide wired network connectivity (e.g., Ethernet) in addition to or instead of a wireless interface.

In some aspects, communications subsystem 1624 may also receive input communication in the form of structured and/or unstructured data feeds 1626, event streams 1628, event updates 1616, and the like on behalf of one or more users who may use computer system 1600.

By way of example, communications subsystem 1624 may be configured to receive unstructured data feeds 1626 in real-time from users of social media networks and/or other communication services such as Twitter® feeds, Face-book® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1616, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1616, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the disclosure are described with reference to specific aspects thereof, but those skilled in the art will recognize that the disclosure is not limited thereto. Various features and aspects of the above-described disclosure may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for servicing a natural language query via a database, the method comprising:
   accessing a database with tables, wherein each table comprises a label identifying the table, and fields, each field comprising an attribute;
   accessing a custom database index comprising entities, the entities comprising the fields, attributes of the fields, and a set of connected nodes including a root node and at least one terminal node that indicates a synonym for the root node;
   forming a search query comprising a path from the root node to a respective terminal node;
   obtaining a set of search results by providing the search query to a search engine;
   adding additional synonyms to the custom database index based at least in part on common terms identified from the set of search results;
   accessing a natural language search query;
   constructing a parse tree from the natural language search query, wherein the parse tree comprises at least one terminal node comprising a word type and at least one terminal node that represents a word or phrase of the natural language search query, wherein the parse tree identifies syntactic information of the natural language search query;
   identifying, from the parse tree, one or more clauses, wherein a clause comprises keywords and wherein each keyword is a noun or a verb;

performing one or more of the following:
  matching each keyword to either (i) a label of one of the tables or (ii) a field of one of the tables or (iii) an attribute of a field, and
  determining a threshold level of a match between a keyword and the custom database index;
generating a database query from the matched keywords;
obtaining a result from the database by providing the database query to the database; and
displaying the result to a user device.

2. The method of claim 1, further comprising:
responsive to determining that the keyword of the keywords is not matched in the database, inserting an implicit node into the parse tree, wherein the implicit node identifies the keyword; and
presenting the keyword to the user device.

3. The method of claim 2, further comprising:
receiving a clarification from the user device;
updating the parse tree based on the clarification; and
matching updated clauses from the parse tree to the database.

4. The method of claim 1, wherein matching each keyword comprises matching one of the keywords to the label of one of the tables.

5. The method of claim 1, wherein matching each keyword comprises matching one of the keywords to a threshold number of words of a field of one of the tables.

6. The method of claim 1, wherein matching each keyword comprises:
determining one or more synonyms of a keyword; and
matching the one or more synonyms to a field of one of the tables.

7. The method of claim 1, wherein determining the threshold level of the match comprises:
obtaining a plurality of candidates by searching the custom database index, and
determining, for each candidate, a level of match between the candidate and the keyword; and
determining the candidate with a highest level of match.

8. The method of claim 7, wherein the level of match between the keyword and the candidate of the custom database index is determined using a term frequency-inverse document frequency.

9. The method of claim 1, wherein adding additional synonyms to the custom database index based at least in part on common keywords identified from the set of search results comprises:
computing a pair-wise generalization of each pair of search results of the set of search results, wherein pair-wise generalization extracts one or more keywords common to each search result of a respective pair;
extracting a set of words or phrases from the pair-wise generalizations;
extracting a subset of the set of words or phrases that occur above a threshold frequency within the pair-wise generalizations;
creating new nodes from the extracted subset of the set of words or phrases; and
connecting the new nodes to a respective terminal node.

10. A system comprising:
a computer-readable medium storing non-transitory computer-executable program instructions; and
a processing device communicatively coupled to the computer-readable medium for executing the non-transitory computer-executable program instructions, wherein executing the non-transitory computer-executable program instructions configures the processing device to perform operations comprising:
  accessing a database with tables, wherein each table comprises a label identifying the table, and fields, each field comprising an attribute;
  accessing a custom database index comprising entities, the entities comprising the fields, attributes of the fields, and a set of connected nodes including a root node and at least one terminal node that indicates a synonym for the root node;
  forming a search query comprising a path from the root node to a respective terminal node;
  obtaining a set of search results by providing the search query to a search engine;
  adding additional synonyms to the custom database index based at least in part on common terms identified from the set of search results;
  accessing a natural language search query;
  constructing a parse tree from the natural language search query, wherein the parse tree comprises at least one terminal node comprising a word type and at least one terminal node that represents a word or phrase of the natural language search query, wherein the parse tree identifies syntactic information of the natural language search query;
  identifying, from the parse tree, one or more clauses, wherein a clause comprises keywords and wherein each keyword is a noun or a verb;
  performing one or more of the following:
    matching each keyword to either (i) a label of one of the tables or (ii) a field of one of the tables or (iii) an attribute of a field, and
    determining a threshold level of a match between a keyword and the custom database index;
  generating a database query from the matched keywords;
  obtaining a result from the database by providing the database query to the database; and
  displaying the result to a user device.

11. The system of claim 10, wherein the operations further comprise:
responsive to determining that the keyword of the keywords is not matched in the database, inserting an implicit node into the parse tree, wherein the implicit node identifies the keyword; and
presenting the keyword to the user device.

12. The system of claim 11, wherein the operations further comprise:
receiving a clarification from the user device;
updating the parse tree based on the clarification; and
matching updated clauses from the parse tree to the database.

13. The system of claim 10, wherein matching each keyword comprises:
determining one or more synonyms of a keyword; and
matching the one or more synonyms to a field of one of the tables.

14. The system of claim 10, wherein determining a threshold level of a match comprises:
obtaining a plurality of candidates by searching the custom database index, and
determining, for each candidate, a level of match between the candidate and the keyword; and
determining the keyword with a highest level of match.

15. The system of claim 10, wherein the threshold level of the match between the keyword and the custom database index is determined using a term frequency-inverse document frequency.

16. The system of claim 10, wherein adding additional synonyms to the custom database index based at least in part on common keywords identified from the set of search results comprises:
computing a pair-wise generalization of each pair of search results of the set of search results, wherein pair-wise generalization extracts one or more keywords common to each search result of a respective pair;
extracting a set of words or phrases from the pair-wise generalizations;
extracting a subset of words or phrases that occur above a threshold frequency within the pair-wise generalizations;
creating new nodes from the extracted subset of the set of words or phrases; and
connecting the new nodes to a respective terminal node.

17. A non-transitory computer-readable storage medium storing computer-executable program instructions, wherein when executed by a processing device, the program instructions cause the processing device to perform operations comprising:
accessing a database with tables, wherein each table comprises a label identifying the table, and fields, each field comprising an attribute;
accessing a custom database index comprising entities, the entities comprising the fields, attributes of the fields, and a set of connected nodes including a root node and at least one terminal node that indicates a synonym for the root node;
forming a search query comprising a path from the root node to a respective terminal node;
obtaining a set of search results by providing the search query to a search engine;
adding additional synonyms to the custom database index based at least in part on common terms identified from the set of search results;
accessing a natural language search query;
constructing a parse tree from the natural language search query, wherein the parse tree comprises at least one terminal node comprising a word type and at least one terminal node that represents a word or phrase of the natural language search query, wherein the parse tree identifies syntactic information of the natural language search query;
identifying, from the parse tree, one or more clauses, wherein a clause comprises keywords and wherein each keyword is a noun or a verb;
performing one or more of the following:
matching each keyword to either (i) a label of one of the tables or (ii) a field of one of the tables or (iii) an attribute of a field, and
determining a threshold level of a match between the keyword and the custom database index;
generating a database query from the matched keywords;
obtaining a result from the database by providing the database query to the database; and
displaying the result to a user device.

18. The non-transitory computer-readable storage medium of claim 17, wherein the operations further comprise:
responsive to determining that the keyword of the keywords is not matched in the database, inserting an implicit node into the parse tree, wherein the implicit node identifies the keyword; and
presenting the keyword to the user device.

19. The non-transitory computer-readable storage medium of claim 17, wherein determining a threshold level of a match comprises:
obtaining a plurality of candidates by searching the custom database index, and
determining, for each candidate, a level of match between the candidate and the keyword; and
determining the keyword with a highest level of match.

20. The non-transitory computer-readable storage medium of claim 17, wherein adding additional synonyms to the custom database index based at least in part on common keywords identified from the set of search results comprises:
computing a pair-wise generalization of each pair of search results of the set of search results, wherein pair-wise generalization extracts one or more keywords common to each search result of a respective pair;
extracting a set of words or phrases from the pair-wise generalizations;
extracting a subset of words or phrases that occur above a threshold frequency within the pair-wise generalizations;
creating new nodes from the extracted subset of the words or phrases; and
connecting the new nodes to a respective terminal node.

* * * * *

UNITED STATES PATENT AND TRADEMARK OFFICE
CERTIFICATE OF CORRECTION

Page 1 of 3

PATENT NO. : 10,592,505 B2
APPLICATION NO. : 16/522549
DATED : March 17, 2020
INVENTOR(S) : Galitsky It is certified that error appears in the above-identified patent and that said Letters Patent is hereby corrected as shown below:

On the Title Page

On page 2, Column 2, item (56), under Other Publications, Line 14, delete "http://www.Irec-conf.org/proceedings/Irec2002/" and insert -- http://www.lrec-conf.org/proceedings/lrec2002/ --, therefor.

In the Drawings

On sheet 11 of 16, in FIG. 11, Line 7, delete "deductlons" and insert -- deductions --, therefor.

On sheet 11 of 16, in FIG. 11, Line 12, delete "year." and insert -- year, --, therefor.

On sheet 11 of 16, in FIG. 11, Line 15, delete "Doductions" and insert -- Deductions --, therefor.

On sheet 11 of 16, in FIG. 11, Line 16, delete "cradlts. Tlps" and insert -- credits. Tips --, therefor.

On sheet 11 of 16, in FIG. 11, Line 17, delete "vourtaxes." and insert -- your taxes. --, therefor.

On sheet 11 of 16, in FIG. 11, Line 17, delete "vourtaxes." and insert -- your taxes. --, therefor.

On sheet 11 of 16, in FIG. 11, Line 19, delete "gov/taxtoplcs/tc503" and insert -- gov/taxtopics/tc503 --, therefor.

On sheet 11 of 16, in FIG. 11, Line 26, delete "whot" and insert -- what --, therefor.

On sheet 11 of 16, in FIG. 11, Line 26, delete "deductlon.htm" and insert -- deduction.htm --, therefor.

On sheet 12 of 16, in FIG. 12, Line 8, delete "goln" and insert -- going --, therefor.

Signed and Sealed this
Twenty-seventh Day of October, 2020

Andrei Iancu
*Director of the United States Patent and Trademark Office*

On sheet 12 of 16, in FIG. 12, Line 10, delete "B ill" and insert -- Bill --, therefor.

On sheet 12 of 16, in FIG. 12, Line 11, delete "deductlons" and insert -- deductions --, therefor.

On sheet 12 of 16, in FIG. 12, Line 15, delete "Gulde" and insert -- Guide --, therefor.

On sheet 12 of 16, in FIG. 12, Line 18, delete "Overloo" and insert -- Overlook --, therefor.

On sheet 13 of 16, in FIG. 13, Line 7, delete "taxtoplcs" and insert -- taxtopics --, therefor.

On sheet 13 of 16, in FIG. 13, Line 13, delete "Don'tdeduct" and insert -- Don't deduct --, therefor.

On sheet 13 of 16, in FIG. 13, Line 22, delete "onlydeduct" and insert -- only deduct --, therefor.

In the Specification

In Column 4, Line 25, delete "year?"" and insert -- year?". --, therefor.

In Column 12, Line 27, delete "_id" and insert -- _id. --, therefor.

In Column 12, Line 35, delete "an" and insert -- An --, therefor.

In Column 13, Line 10, delete "Simchez" and insert -- Sánchez --, therefor.

In Column 13, Line 10, delete "Simchez" and insert -- Sánchez --, therefor.

In Column 15, Line 45, delete "{vision, technology—}" and insert -- {vision, technology} --, therefor.

In Column 15, Line 47, delete "(vision)." and insert -- {vision}. --, therefor.

In Column 15, Line 62, delete "{b,c})." and insert -- {b c}). --, therefor.

In Column 17, Line 17, delete "expense}})." and insert -- expense}}. --, therefor.

In Column 17, Line 28, delete "socre(a3)" and insert -- score(a3) --, therefor.

In Column 17, Line 38, delete "pdf," and insert -- 'pdf', --, therefor.

In Column 17, Line 39, delete "tares"." and insert -- taxes". --, therefor.

In Column 17, Line 45, delete "{<tar>" and insert -- {<tax> --, therefor.

In Column 17, Line 67, delete "$a_i \cap (T_p \cap q))$" and insert -- $(a_i \cap (T_p \cap q))$ --, therefor.

In Column 19, Line 37, delete "afor" and insert -- for --, therefor.

In Column 19, Line 54, delete "$t_{1k2}$ . . . . , $t_{2k1}$," and insert -- $t_{1k2}$, . . . . , $t_{2k1}$ --, therefor.

In Column 19, Line 55, delete "Each Terminal Node" and insert -- each terminal node --, therefor.

In Column 20, Line 3, delete "$(A_q)=\Lambda^{high}(\Lambda_q)/T_k$" and insert -- $(A_q)=\Lambda^{high}(A_q)/T_k$ --, therefor.

In Column 20, Line 18, delete "$\{t_1, t_2 \ldots t_n\}$," and insert -- $\{t_1, t_2 \ldots t_n\}$ --, therefor.

In Column 20, Line 42, delete ""tar" and insert -- "tax --, therefor.

In Column 20, Line 58, delete "(deduct," and insert -- {deduct, --, therefor.

In Column 20, Line 59, delete "account")." and insert -- account}. --, therefor.

In Column 21, Line 19, delete "collection), (sell" and insert -- collection}, {sell --, therefor.